United States Patent
Onaka

(10) Patent No.: US 9,910,221 B2
(45) Date of Patent: Mar. 6, 2018

(54) POLARIZATION REDUCING APPARATUS, LIGHT SOURCE APPARATUS, OPTICAL AMPLIFYING APPARATUS, AND EXCITATION LIGHT SOURCE APPARATUS FOR RAMAN AMPLIFICATION

(71) Applicant: FUJITSU LIMITED, Kawasaki-shi, Kanagawa (JP)

(72) Inventor: Miki Onaka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/228,575

(22) Filed: Aug. 4, 2016

(65) Prior Publication Data
US 2016/0341900 A1     Nov. 24, 2016

Related U.S. Application Data

(60) Division of application No. 14/479,895, filed on Sep. 8, 2014, now Pat. No. 9,411,098, which is a (Continued)

(51) Int. Cl.
*G02B 6/27*     (2006.01)
*G02B 6/10*     (2006.01)
(Continued)

(52) U.S. Cl.
CPC ....... *G02B 6/2786* (2013.01); *G02B 6/12004* (2013.01); *G02B 6/125* (2013.01);
(Continued)

(58) Field of Classification Search
CPC ...... G02B 6/105; G02B 6/126; G02B 6/2786; G02B 6/12004
See application file for complete search history.

(56) References Cited

U.S. PATENT DOCUMENTS 6,238,063 B1     5/2001  Tanitsu et al.
2002/0025111 A1  2/2002  Koshi
(Continued)

FOREIGN PATENT DOCUMENTS

JP     07-159632     6/1995
JP     07-248422     9/1995
(Continued)

OTHER PUBLICATIONS

Taillaert et al. "A compact Two-dimensional grating coupler used as a polarization splitter", IEEE Phtonics Technology Letters, vol. 15, No. 9, pp. 1249-1251 (2003).*
(Continued)

*Primary Examiner* — Eric L Bolda
(74) *Attorney, Agent, or Firm* — Staas & Halsey LLP

(57) ABSTRACT

A polarization reducing apparatus includes a separating unit configured to separate input light into components having polarization directions orthogonal to each other; a winding waveguide of silicon formed on a silicon substrate in a winding manner, the winding waveguide transmitting a first component among the components separated by the separating unit; an optical path configured to have a shorter optical path length than the winding waveguide, the optical path transmitting a second component among the components separated by the separating unit; a combining unit configured to combine the first component and the second component; and an output unit configured to output light consisting of the first component and the second component combined by the combining unit.

2 Claims, 27 Drawing Sheets

Related U.S. Application Data continuation of application No. PCT/JP2012/057068, filed on Mar. 19, 2012.

(51) Int. Cl.

| | | |
|---|---|---|
| *G02B 6/12* | (2006.01) | |
| *G02B 6/42* | (2006.01) | |
| *G02B 27/28* | (2006.01) | |
| *G02B 6/125* | (2006.01) | |
| *G02B 6/126* | (2006.01) | |
| *H01S 3/067* | (2006.01) | |
| *H01S 3/10* | (2006.01) | |
| *H01S 3/30* | (2006.01) | |
| *G02B 6/293* | (2006.01) | |
| *G02F 1/01* | (2006.01) | |

(52) U.S. Cl.
CPC .............. *G02B 6/126* (2013.01); *G02B 6/272* (2013.01); *G02B 6/29346* (2013.01); *G02B 6/29395* (2013.01); *G02B 6/29397* (2013.01); *G02B 6/4213* (2013.01); *G02B 27/283* (2013.01); *G02B 27/286* (2013.01); *G02F 1/0147* (2013.01); *H01S 3/06754* (2013.01); *H01S 3/1003* (2013.01); *H01S 3/10023* (2013.01); *H01S 3/302* (2013.01); *G02B 2006/12061* (2013.01); *G02B 2006/12116* (2013.01)

(56) References Cited

U.S. PATENT DOCUMENTS

| | | |
|---|---|---|
| 2003/0086174 A1 | 5/2003 | Wakisaka et al. |
| 2003/0161023 A1 | 8/2003 | Gillin et al. |
| 2003/0206336 A1 | 11/2003 | Onaka et al. |
| 2013/0188971 A1* | 7/2013 | Painchaud ........... H04B 10/612 398/214 |

FOREIGN PATENT DOCUMENTS

| | | |
|---|---|---|
| JP | 11-174365 | 7/1999 |
| JP | 11-312631 | 11/1999 |
| JP | 2002-031735 | 1/2002 |
| JP | 2003-029209 | 1/2003 |
| JP | 2003-324227 | 11/2003 |
| JP | 2003-347676 | 12/2003 |
| JP | 2005-061904 | 3/2005 |
| JP | 2007-052328 | 3/2007 |

OTHER PUBLICATIONS

Chinese Office Action dated Nov. 2, 2016 in corresponding Chinese Patent Application No. 201280071551.6.
International Search Report dated May 15, 2012 in corresponding international application PCT/JP2012/057068.
PCT International Preliminary Report on Patentability dated Oct. 2, 2014 in corresponding International Patent Application No. PCT/JP2012/057068.
Office Action dated Nov. 17, 2015 in copending U.S. Appl. No. 14/479,895.
Notice of Allowance dated Apr. 8, 2016 in copending U.S. Appl. No. 14/479,895.
U.S. Appl. No. 14/479,895, filed Sep. 8, 2014, Miki Onaka, Fujitsu Limited.

* cited by examiner

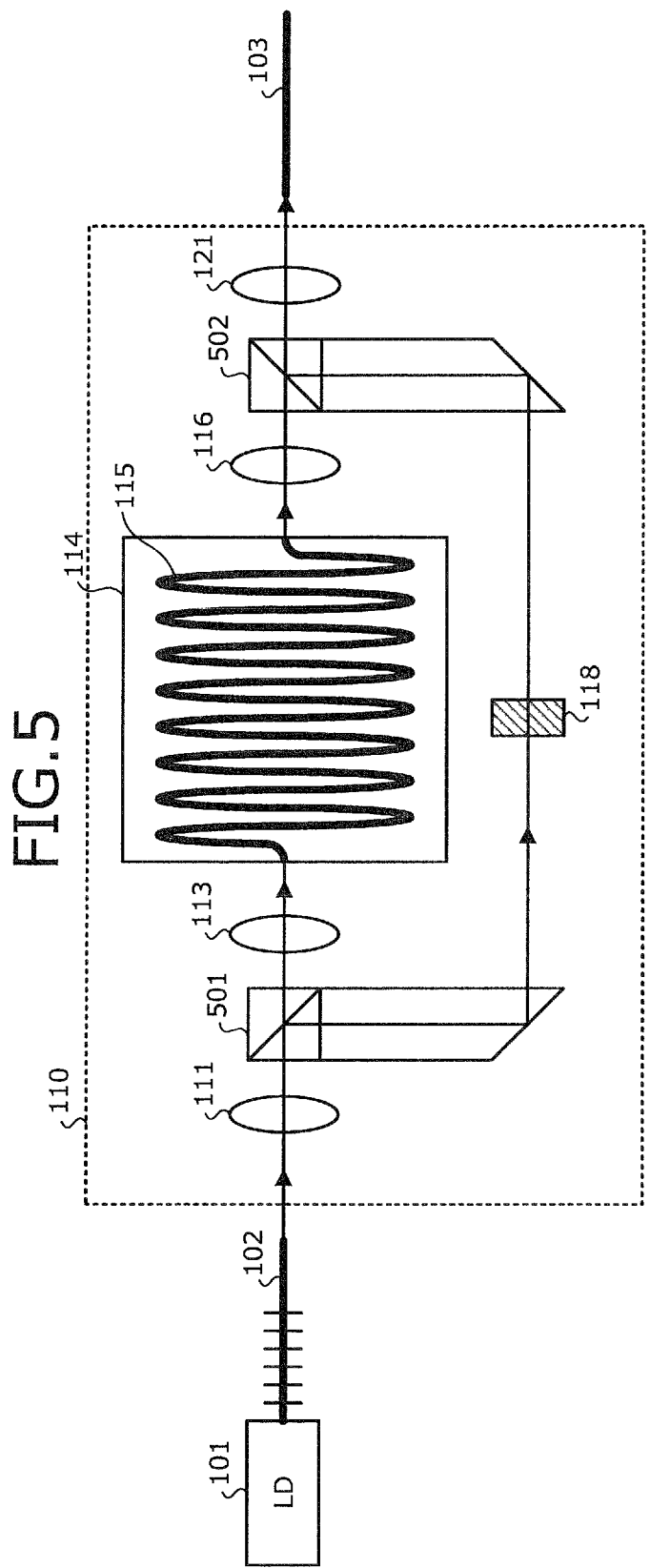

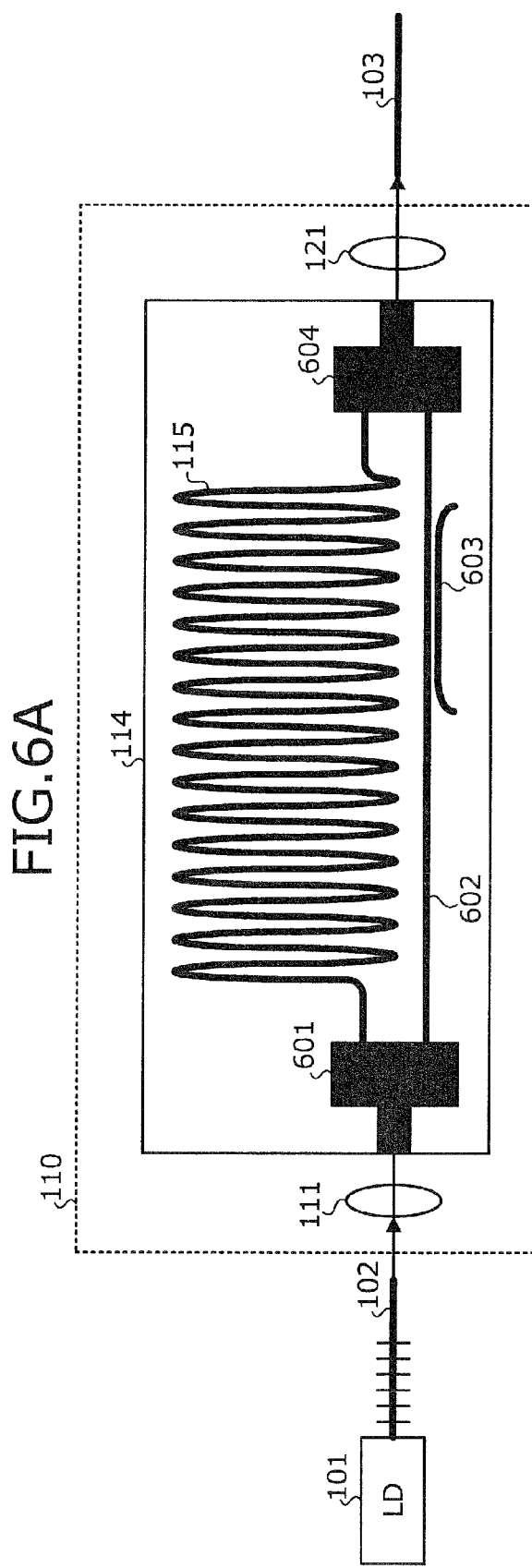

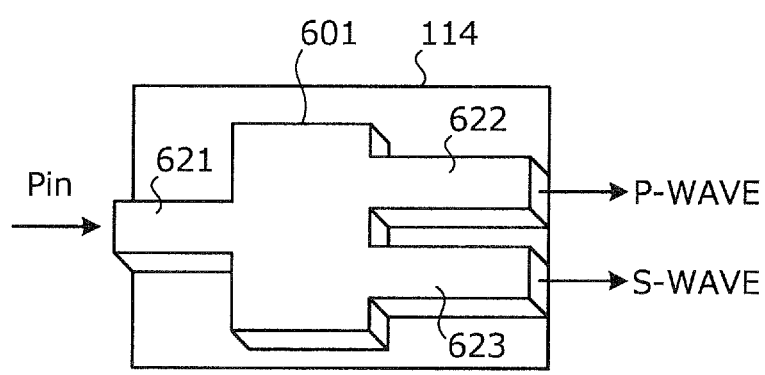
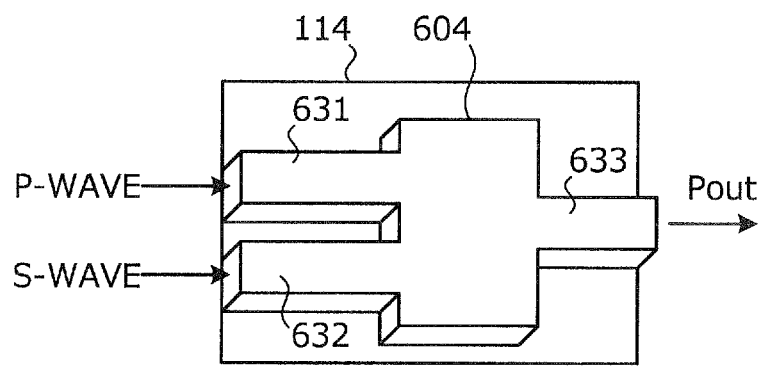

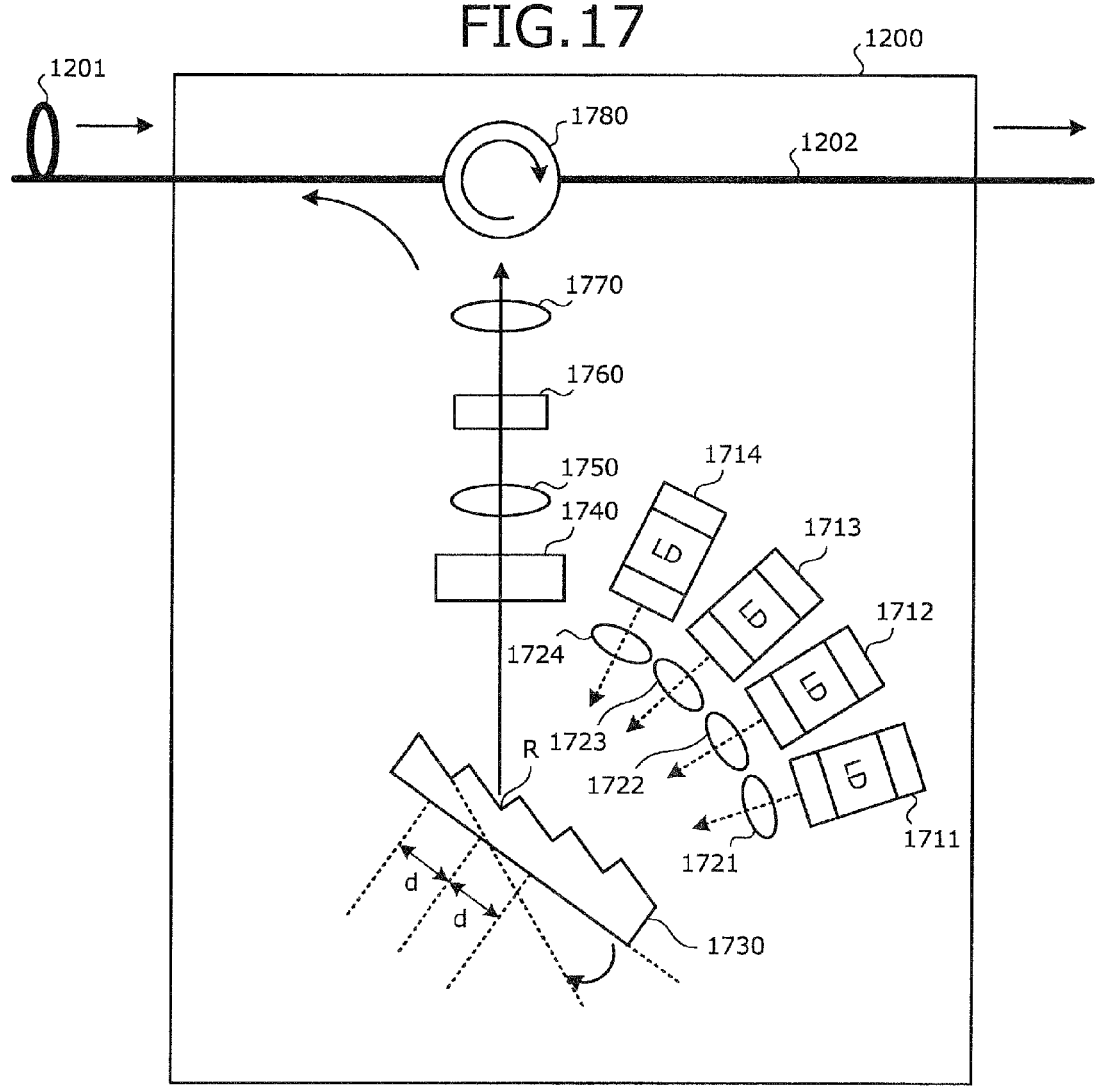

POLARIZATION REDUCING APPARATUS, LIGHT SOURCE APPARATUS, OPTICAL AMPLIFYING APPARATUS, AND EXCITATION LIGHT SOURCE APPARATUS FOR RAMAN AMPLIFICATION

CROSS REFERENCE TO RELATED APPLICATIONS

This application is a divisional of and claims priority benefit to U.S. patent application Ser. No. 14/479,895, filed Sep. 8, 2014, which is a continuation application of International Application PCT/JP2012/057068, filed on Mar. 19, 2012 and designating the U.S., the entire contents of which are incorporated herein by reference.

FIELD

The embodiments discussed herein are related to a polarization reducing apparatus, a light source apparatus, an optical amplifying apparatus, and an excitation light source apparatus for Raman amplification.

BACKGROUND

A conventionally known depolarizer converts completely polarized or partially polarized input light into non-polarized light before output (see, e.g., Japanese Laid-Open Patent Publication Nos. H7-248422 and H7-159632). The depolarizer is implemented by a long polarization maintaining fiber (PMF), for example. A Lyot-type depolarizer is known that is fabricated by fusing two PMFs at 45 degrees. The depolarizer is used for converting excitation light into non-polarized light in a Raman amplifier, which amplifies light by utilizing the spontaneous Raman scattering of optical fibers.

Nonetheless, the conventional techniques have a problem of increased apparatus size consequent to the long polarization maintaining fiber.

SUMMARY

According to an aspect of an embodiment, a polarization reducing apparatus includes a separating unit configured to separate input light into components having polarization directions orthogonal to each other; a winding waveguide of silicon formed on a silicon substrate in a winding manner, the winding waveguide transmitting a first component among the components separated by the separating unit; an optical path configured to have a shorter optical path length than the winding waveguide, the optical path transmitting a second component among the components separated by the separating unit; a combining unit configured to combine the first component and the second component; and an output unit configured to output light consisting of the first component and the second component combined by the combining unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram of a fourth configuration example of the polarization reducing apparatus according to the first embodiment;

FIG. 6A is a diagram of a fifth configuration example of the polarization reducing apparatus according to the first embodiment;

FIG. 6B is an enlarged diagram of a polarization separation waveguide unit formed on a silicon substrate;

FIG. 6C is an enlarged diagram of a polarization combination waveguide unit formed on the silicon substrate;

FIG. 17 is a diagram of a sixth configuration example of the optical amplifying apparatus;

DESCRIPTION OF EMBODIMENTS

Embodiments of a polarization reducing apparatus, a light source apparatus, an optical amplifying apparatus, and an excitation light source apparatus for Raman amplification will be described in detail with reference with the accompanying drawings.

Figure 1:
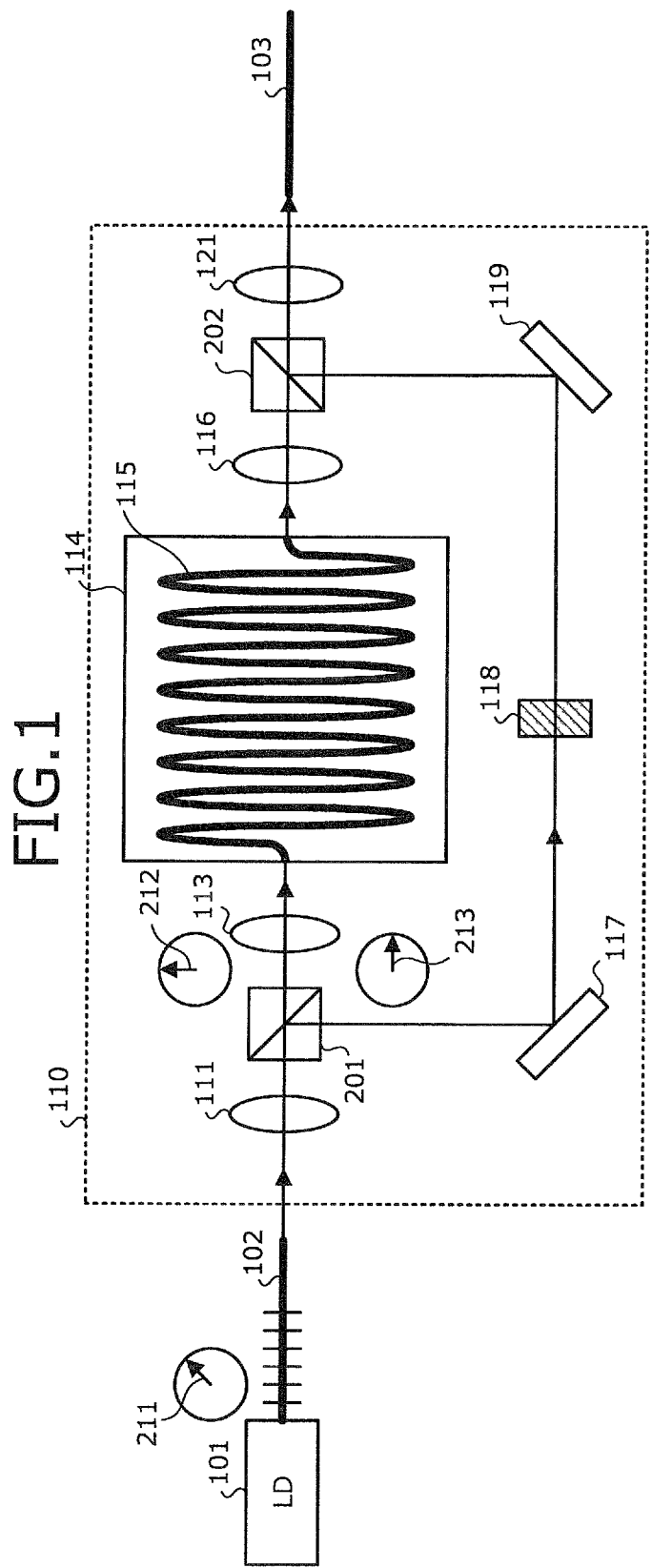
FIG. 1 is a diagram of a first configuration example of a polarization reducing apparatus according to a first embodiment.

FIG. 1 is a diagram of a first configuration example of a polarization reducing apparatus according to a first embodiment. As depicted in FIG. 1, a polarization reducing apparatus 110 according to the first embodiment includes a lens 111, a polarization separator 201, a lens 113, a silicon substrate 114, a lens 116, a mirror 117, a loss medium 118, a mirror 119, a polarization combiner 202, and a lens 121. The lens 111 and the lens 121 may be disposed outside the polarization reducing apparatus 110.

The polarization state of light emitted from a laser diode (LD) 101 is maintained by a PMF 102 as the light enters the polarization reducing apparatus 110. The PMF 102 may include a fiber Bragg grating (FBG), thereby enabling the light emitted from the LD 101 to have a constant wavelength. An oscillation wavelength can be changed by, for example, applying stress to a diffraction grating portion or changing the temperature of the diffraction grating to change diffraction grating intervals. The lens 111 transmits the light (input light) entering the polarization reducing apparatus 110 to the polarization separator 201.

The polarization separator 201 is a polarization separator (separator) that separates the light from the lens 111 into light of a polarization component in a vertical direction (first direction) and light of a polarization component in a horizontal direction (second direction) orthogonal to the vertical direction, included in the light from the lens 111. The polarization separator 201 outputs the separated light of the polarization component in the vertical direction to the lens 113. A polarization state 212 indicates the polarization state (vertical direction) of the light output from the polarization separator 201 to the lens 113. The polarization separator 201 outputs the separated light of the polarization component in the horizontal direction to the mirror 117. A polarization state 213 indicates the polarization state (horizontal direction) of the light output from the polarization separator 201 to the mirror 117. The lens 113 transmits the light from the polarization separator 201 to the silicon substrate 114.

The silicon substrate 114 is provided with a winding waveguide 115 formed in a meandering manner of silicon. For example, the winding waveguide 115 is a silicon thin line waveguide formed by processing the silicon substrate 114. Such configuration enables optical loss to be suppressed even when a bend radius of the winding waveguide 115 is made smaller. Consequently, the winding waveguide 115 can be allowed to meander in the silicon substrate 114 to form a long waveguide (e.g., several millimeters).

Silicon has a high refractive index (e.g., 4.2). Therefore, a long optical path length (length×refractive index) can be realized in a small space. The winding waveguide 115 transmits the light from the lens 113 to the lens 116. The lens 116 transmits the light from the winding waveguide 115 to the polarization combiner 202.

The mirror 117 is a 100% reflecting mirror that reflects the light from the polarization separator 201 and outputs the light to the loss medium 118. The mirror 119 is a 100% reflecting mirror that reflects the light from the loss medium 118 and outputs the light to the polarization combiner 202. As described, the mirrors 117 and 119 form an optical path that has an optical path length that is shorter than the winding waveguide 115 and that transmits the light from the polarization separator 201. Such configuration enables the formation of an optical path in which light propagates through a space (air). The lower refractive index of air (e.g., 1.0) enables an optical path length that is shorter than the winding waveguide 115 to be realized.

The loss medium 118 induces optical loss on the light output from the mirror 117 and outputs the resulting light to the mirror 119. The loss medium 118 may be disposed between the polarization separator 201 and the mirror 117 or between the mirror 119 and the polarization combiner 202. For example, various optical loss mediums such as a metal evaporated film and a half mirror may be used for the loss medium 118.

The polarization combiner 202 performs polarization combination of the light from the lens 116 and the light from the mirror 119. The polarization combiner 202 outputs the polarization-combined light to the lens 121. In the configuration described with reference to FIG. 1, the light of the polarization component in the vertical direction is transmitted through the winding waveguide 115 while the light of the polarization component in the horizontal direction is transmitted through the mirrors 117 and 119. In contrast, the light of the polarization component in the horizontal direction may be transmitted through the winding waveguide 115, and the light of the polarization component in the vertical direction may be transmitted through the mirrors 117 and 119.

The lens 121 transmits the light from the polarization combiner 202 and outputs the light downstream by, for example, a single mode fiber (SMF) 103.

The polarization reducing apparatus 110 depicted in FIG. 1 can separate the light emitted from the LD 101 into components whose polarization directions are orthogonal to each other, transmit one of the components through the winding waveguide 115 formed of silicon, and combine the component with the other component. As a result, the polarization reducing apparatus 110 can subject the separated components to a larger optical path length difference, in a smaller space and reduce the degree of polarization (DOP) of the light. Consequently, reductions in the size of the apparatus can be achieved.

For example, the winding waveguide 115 is formed such that the optical path length difference of the winding waveguide 115 and the optical path made up of the mirrors 117, 119, etc. becomes greater than or equal to the coherence length of the light emitted from the LD 101. As a result, a depolarizer can be realized that converts the light emitted from the LD 101 into light containing polarized lights in every condition (having a polarization degree of 0%).

The optical path made up of the mirrors 117, 119, etc. can be formed to have a lower refractive index than the winding waveguide 115 so as to apply a larger optical path length difference to the light. Although the polarization reducing apparatus 110 depicted in FIG. 1 has the mirror 117 and mirror 119 making up the optical path in which light propagates through a space, the optical path may be formed of an optical fiber having a refractive index lower than silicon, for example.

The optical loss of the loss medium 118 is set so that at the polarization combiner 202, the intensities of the light passing through the winding waveguide 115 and the light passing through the mirror 117 and the loss medium 118 are equal, for example. As a result, even if the loss of the winding waveguide 115 is large (e.g., 0.1 to 0.2 [db/cm]), the intensities of the lights combined by the polarization combiner 202 can be equalized to reduce the polarization degree of the light output from the polarization combiner 202.

Figure 2:
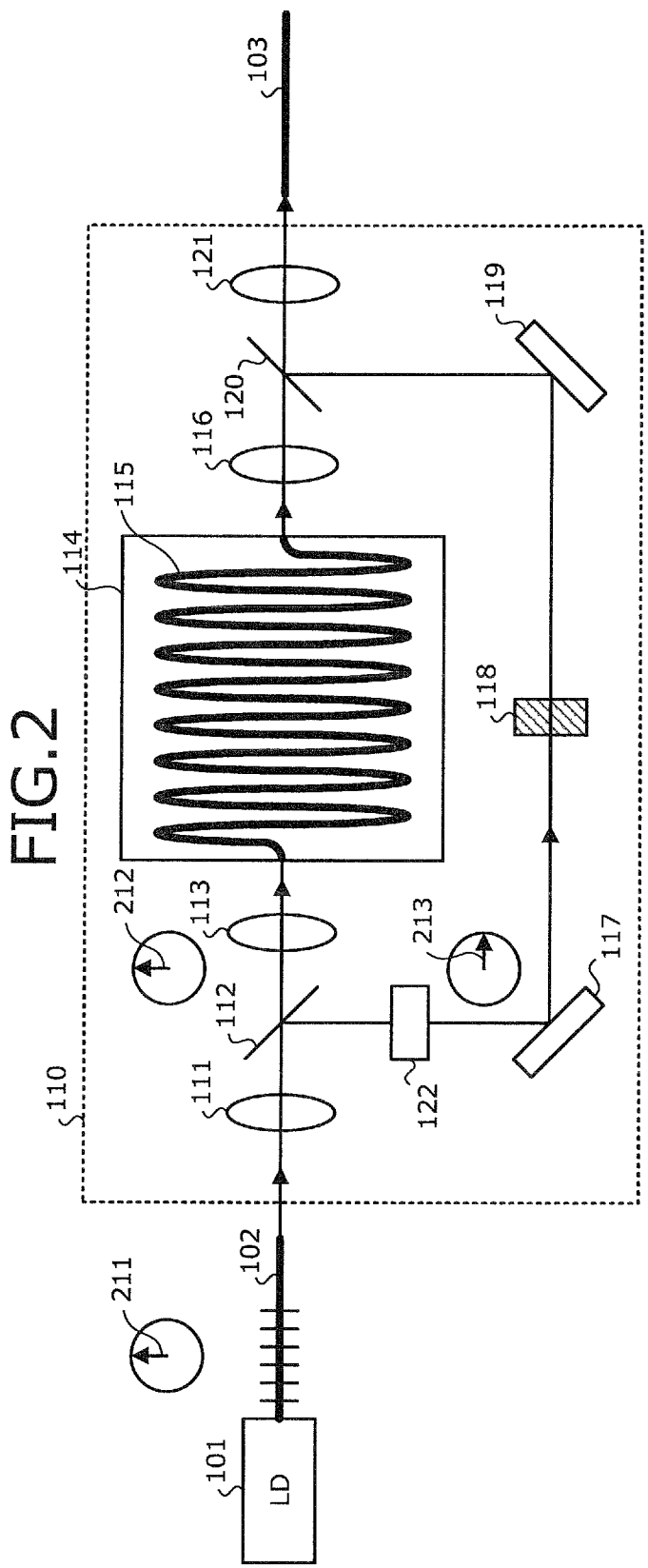
FIG. 2 is a diagram of a modification of the first configuration example of the polarization reducing apparatus according to the first embodiment.

FIG. 2 is a diagram of a modification of the first configuration example of the polarization reducing apparatus according to the first embodiment. In FIG. 2, portions identical to those depicted in FIG. 1 are denoted by the same reference numerals used in FIG. and will not be further described. As depicted in FIG. 2, the polarization reducing apparatus 110 may include a branching unit 112, a ½ wavelength plate 122, and a combining unit 120 instead of the polarization separator 201 and the polarization combiner 202 depicted in FIG. 1.

The branching unit 112 branches the light from the lens 111 and outputs the resulting branches to the lens 113 and the ½ wavelength plate 122, respectively. The branching unit 112 can be implemented by an optical coupler or a half mirror, for example. As indicated by the polarization state 212, the polarization state of the light output from the branching unit 112 to the lens 113 is in the vertical direction. The lens 113 transmits the light from the branching unit 112 to the silicon substrate 114.

The branching unit 112 is a polarization adjusting unit that causes the polarization directions of the light transmitted through the winding waveguide 115 and the light transmitted through the optical path of the mirrors 117, 119 orthogonal to each other. For example, the ½ wavelength plate 122 causes the polarization direction of the light output from the branching unit 112 to rotate 90 degrees and outputs the resulting light to the mirror 117. As indicated by the polarization state 213, the polarization state of the light output from the ½ wavelength plate 122 to the mirror 117 is in the horizontal direction. As described, the branching unit 112 and the ½ wavelength plate 122 can separate the light emitted from the LD 101 into the light of the polarization component in the vertical direction and the light of the polarization component in the horizontal direction. The branching unit 112 and the ½ wavelength plate 122 can reduce insertion loss, facilitate manufacturing, reduce costs, etc. as compared to the configuration for polarization separation using the polarization separator 201 depicted in FIG. 1, for example.

The combining unit 120 combines the light from the lens 116 and the light from the mirror 119. The combining unit 120 outputs the combined light to the lens 121. The combining unit 120 can be implemented by an optical coupler or a half mirror, for example. This may reduce insertion loss, facilitate manufacturing, reduce costs, etc. as compared to the configuration of polarization combination using the polarization combiner 202 depicted in FIG. 1, for example.

However, if the combining unit 120 is implemented by an optical coupler, a half mirror, etc., optical loss (e.g., 3 [dB]) occurs and therefore, the polarization combination is preferably implemented using the polarization combiner 202 (as is the case with FIG. 1). Therefore, for example, consideration may be given to using the branching unit 112 and the ½ wavelength plate 122 depicted in FIG. 2 for separating the light and using the polarization combiner 202 depicted in FIG. 1 for combining the light.

Although the ½ wavelength plate 122 is disposed as the polarization adjusting unit that adjusts the polarization direction of the light output from the branching unit 112 in the configuration depicted in FIG. 2, the configuration of the polarization adjusting unit is not limited to the ½ wavelength plate 122. For example, the polarization adjusting unit may be implemented by a twisted optical fiber etc.

Although the polarized state (vertical direction) of the light emitted from the LD 101 is changed by the ½ wavelength plate 122 into the polarized state of the horizontal direction in the described configuration, the LD 101 may emit light having the polarized state of the horizontal direction. Since the ½ wavelength plate 122 can rotate the polarization direction of the light regardless of the linear polarization direction, the polarization direction of the light output from the branching unit 112 can be rotated 90 degrees and the light emitted from the LD 101 can be separated into the light of the polarization component in the vertical direction and the light of the polarization component in the horizontal direction.

Figure 3:
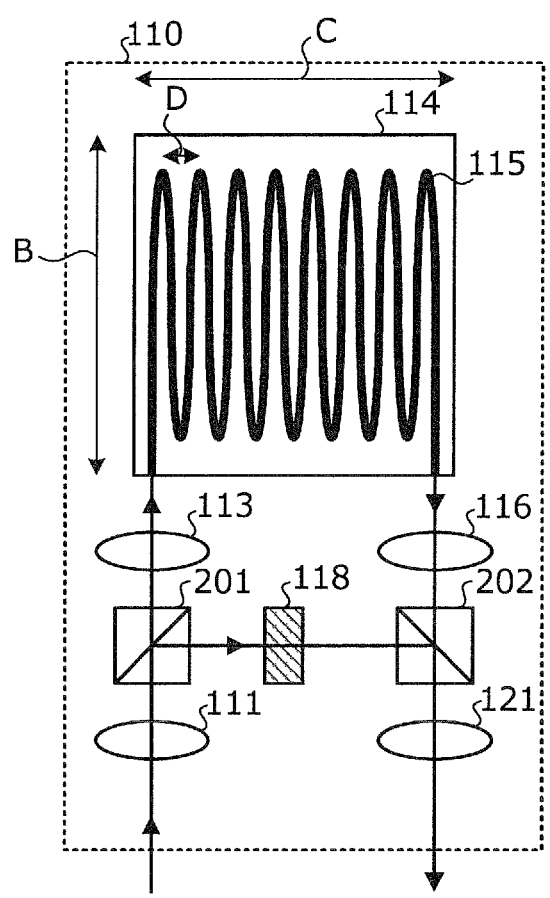
FIG. 3 is a diagram of a second configuration example of the polarization reducing apparatus according to the first embodiment.

FIG. 3 is a diagram of a second configuration example of the polarization reducing apparatus according to the first embodiment. In FIG. 3, portions identical to those depicted in FIG. 2 are denoted by the same reference numerals used in FIG. 2 and will not be further described. As depicted in FIG. 3, both end portions of the winding waveguide 115 may be disposed on one side of the silicon substrate 114.

In the configuration depicted in FIG. 3, an optical path having an optical path length shorter than the winding waveguide 115 is formed by a space between the polarization separator 201 and the polarization combiner 202. The polarization separator 201 outputs the separated light of the polarization component in the horizontal direction to the loss medium 118. The loss medium 118 transmits the light output from the polarization separator 201 and outputs the light to the polarization combiner 202. In the configuration depicted in FIG. 3, for example, the loss medium 118 may be implemented by a metal film evaporated on the polarization separator 201 or the polarization combiner 202.

The polarization combiner 202 performs polarization combination of the light from the lens 116 and the light from the loss medium 118. The configuration depicted in FIG. 3 can be achieved without the mirror 117 and the mirror 119 depicted in FIG. 2. Therefore, the polarization reducing apparatus 110 can be reduced in size.

Since the optical path length of the optical path different from the winding waveguide 115 can be further shortened, the optical path difference can be further increased. Therefore, the polarization degree of the light output from the polarization combiner 202 can be further reduced.

For example, when the length of the winding waveguide 115 is 600 [mm] and the longitudinal length B of the silicon substrate 114 is 2 [mm], the number A of bends in the winding waveguide 115 is $A \approx 600/2 = 300$ [times] (in FIG. 3, A=8 [times] for simplicity). When a distance D between bending portions of the winding waveguide 115 is 20 [μm], a lateral length C of the silicon substrate 114 is $C \approx 300/0.02 = 6$ [mm]. As described, the polarization reducing apparatus 110 can realize the winding waveguide 115 of 600 [mm] in the silicon substrate 114 of 2 [mm]×6 [mm], for example.

Figure 4:
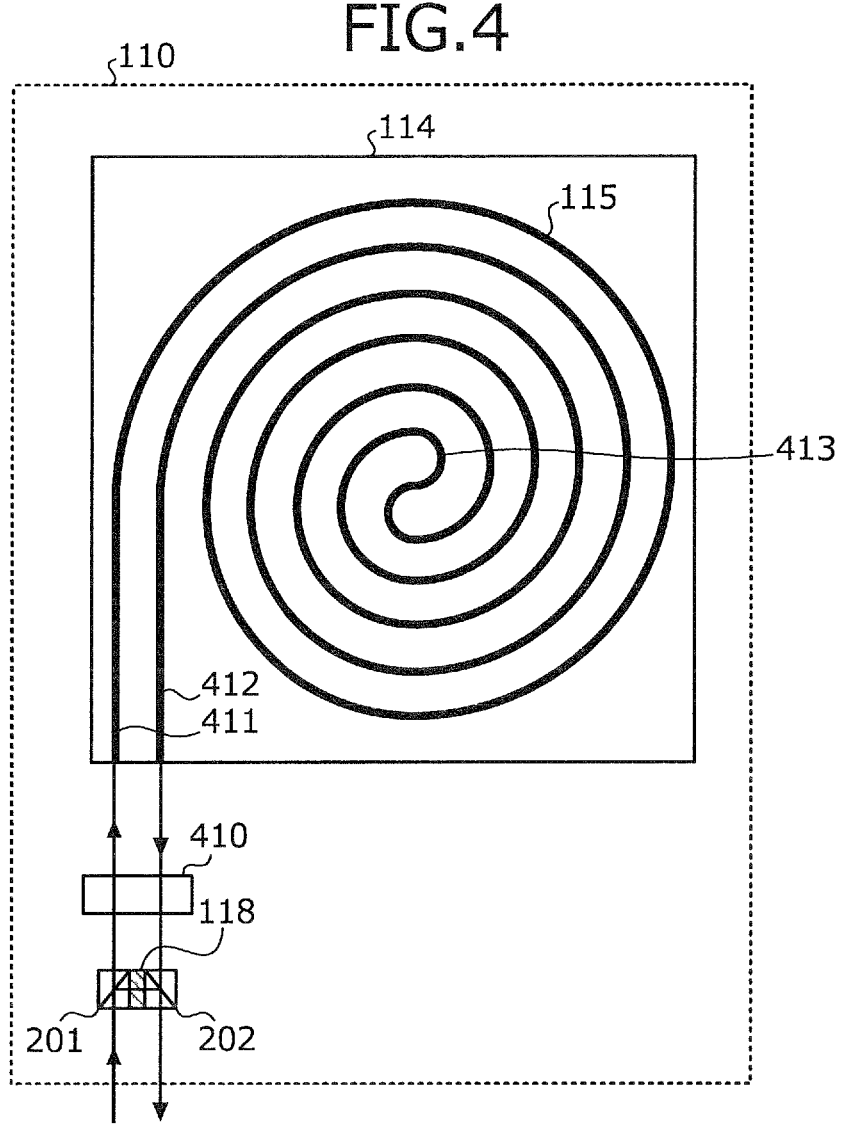
FIG. 4 is a diagram of a third configuration example of the polarization reducing apparatus according to the first embodiment.

FIG. 4 is a diagram of a third configuration example of the polarization reducing apparatus according to the first embodiment. In FIG. 4, portions identical to those depicted in FIG. 3 are denoted by the same reference numerals used in FIG. 3 and will not be further described. As depicted in FIG. 4, the winding waveguide 115 may be spiral-shaped.

In the example depicted in FIG. 4, the winding waveguide 115 is formed by two parallel waveguide units 411, 412, and a connecting waveguide unit 413 connecting the ends of the parallel waveguide units 411, 412 to each other at a central portion of a spiral shape. The parallel waveguide units 411, 412 are formed into a spiral shape such that non-connected ends are led out from an end portion of the silicon substrate 114. As described, the winding waveguide 115 is not limited to the meandering shape and may be winding to be sufficiently longer than the other optical path formed by the mirrors 117, 119, etc.

The polarization reducing apparatus 110 depicted in FIG. 4 is equipped with the loss medium 118 closely attached to the polarization separator 201 and the polarization combiner 202. As a result, the loss medium 118, the polarization separator 201, and the polarization combiner 202 can be formed integrally to enable reductions in the size of the polarization reducing apparatus 110.

The polarization reducing apparatus 110 depicted in FIG. 4 includes a lens array 410 instead of the lenses 113, 116 depicted in FIG. 3. The lens array 410 causes the light from the polarization separator 201 to enter the winding waveguide 115. The lens array 410 transmits the light from the winding waveguide 115 to the polarization combiner 202.

FIG. 5 is a diagram of a fourth configuration example of the polarization reducing apparatus according to the first embodiment. In FIG. 5, portions identical to those depicted in FIG. 2 are denoted by the same reference numerals used in FIG. 2 and will not be further described. As depicted in FIG. 5, the polarization separator 201 and the mirror 117 depicted in FIG. 2 may be formed integrally as a polarization separation prism 501. The polarization combiner 202 and the mirror 119 depicted in FIG. 2 may be formed integrally as a polarization separation prism 502. As a result, the parts count of the polarization reducing apparatus 110 can be reduced.

FIG. 6A is a diagram of a fifth configuration example of the polarization reducing apparatus according to the first embodiment. In FIG. 6A, portions identical to those depicted in FIG. 2 are denoted by the same reference numerals used in FIG. 2 and will not be further described. As depicted in FIG. 6A, the silicon substrate 114 may be equipped with a polarization separation waveguide unit 601, a linear waveguide 602, a loss waveguide 603, and a polarization combination waveguide unit 604. In this case, the polarization separator 201, the lenses 113, 116, the mirrors 117, 119, the loss medium 118, and the polarization combiner 202 depicted in FIG. 2 may be omitted.

The polarization separation waveguide unit 601 separates the light from the lens 111 into light of a polarization component in the vertical direction and light of a polarization component in the horizontal direction. The polarization separation waveguide unit 601 outputs the separated light of the polarization component in the vertical (horizontal) direction to the winding waveguide 115. The polarization separation waveguide unit 601 outputs the separated light of the polarization component in the horizontal (vertical) direction to the linear waveguide 602.

The winding waveguide 115 transmits the light from the polarization separation waveguide unit 601 and outputs the light to the polarization combination waveguide unit 604. The linear waveguide 602 is a silicon waveguide that transmits the light from the polarization separation waveguide unit 601 and outputs the light to the polarization combination waveguide unit 604. For example, the linear waveguide 602 is a silicon thin line waveguide formed by processing the silicon substrate 114.

The loss waveguide 603 is disposed in proximity to at least a portion of the linear waveguide 602. The loss waveguide 603 and the linear waveguide 602 form a coupling portion having a predetermined coupling rate (e.g., 1:1). As a result, a portion of the light transmitted through the linear waveguide 602 is transferred to the loss waveguide 603 and optical loss can be induced on the light transmitted through the linear waveguide 602. For example, the loss waveguide 603 is formed by irradiating the silicon substrate 114 with ultraviolet light (e.g., excimer laser) to change the refractive index of silicon, whereby the coupling efficiency is changed.

The polarization combination waveguide unit 604 performs polarization combination of the light from the winding waveguide 115 and the light from the linear waveguide 602. The polarization combination waveguide unit 604 outputs the polarization-combined light to the lens 121.

As described, the optical path implemented by the mirrors 117, 119 in the configuration depicted in FIG. 2 may be implemented by the linear waveguide 602 formed on the silicon substrate 114. The polarization separator 201 depicted in FIG. 1 may be implemented by the polarization separation waveguide unit 601 formed on the silicon substrate 114. The polarization combiner 202 depicted in FIG. 1 may be implemented by the polarization combination waveguide unit 604 formed on the silicon substrate 114. The loss medium 118 depicted in FIG. 2 may be implemented by the loss waveguide 603 disposed in proximity to the linear waveguide 602 on the silicon substrate 114.

In the silicon substrate 114, the material of the portion in which the linear waveguide 602 is disposed may be formed of a quartz-based member that has quartz as a main material. As a result, since the linear waveguide 602 is formed of the quartz-based member, the refractive index of the linear waveguide 602 can be reduced (e.g., 1.45) and the optical path length difference from the winding waveguide 115 can be increased.

In the silicon substrate 114, the portion in which the linear waveguide 602 is disposed may be removed to form the linear waveguide 602 as a space waveguide. As a result, the refractive index of the linear waveguide 602 can be reduced and the optical path length difference from the winding waveguide 115 can be increased. The silicon substrate 114 depicted in FIG. 6A is characterized in that the depolarizing (polarization degree reducing) structure of the embodiments is integrally formed on the same waveguide substrate to realize a one-chip depolarizer structure, enabling excellent mass productivity.

FIG. 6B is an enlarged diagram of the polarization separation waveguide unit formed on the silicon substrate. As depicted in FIG. 6B, for example, the polarization separation waveguide unit 601 is formed by processing the silicon substrate 114. The polarization separation waveguide unit 601 includes an incident portion 621 and output portions 622, 623.

Light (Pin) from the lens 111 enters the incident portion 621. Of the light entering from the incident unit 621, the output portion 622 outputs to the winding waveguide 115, the light (P-wave) of the polarization component in the vertical direction. Of the light entering from the incident portion 621, the output portion 623 outputs to the linear waveguide 602, the light (S-wave) of the polarization component in the horizontal direction.

FIG. 6C is an enlarged diagram of the polarization combination waveguide unit formed on the silicon substrate. As depicted in FIG. 6C, for example, the polarization combination waveguide unit 604 is formed by processing the silicon substrate 114. The polarization combination waveguide unit 604 includes incident portions 631, 632, and an output portion 633.

The light (P-wave) of the polarization component in the vertical direction from the winding waveguide 115 enters the incident portion 631. The light (S-wave) of the polarization component in the horizontal direction from the linear waveguide 602 enters the incident portion 632. The output portion 633 outputs to the lens 121, the light (Pout) obtained by polarization combination of the light (P-wave) of the polarization component in the vertical direction entering from the incident portion 631 and the light (S-wave) of the polarization component in the horizontal direction entering from the incident portion 632.

Figure 7:
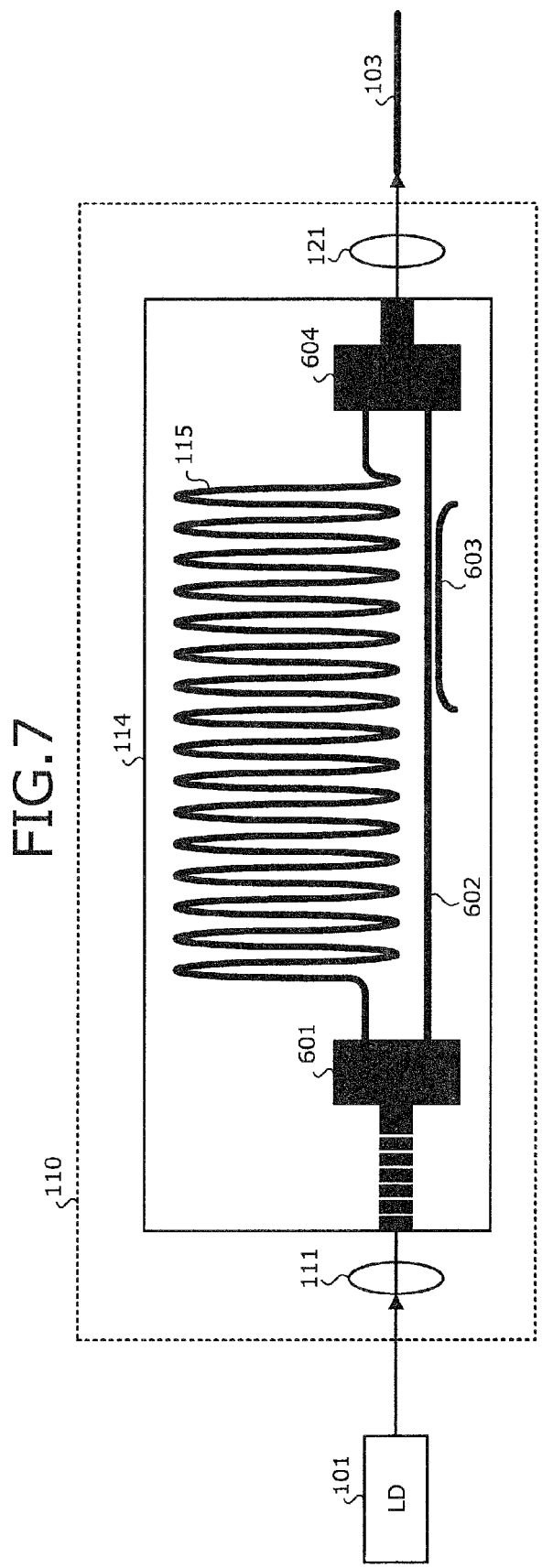
FIG. 7 is a diagram of a sixth configuration example of the polarization reducing apparatus according to the first embodiment.

FIG. 7 is a diagram of a sixth configuration example of the polarization reducing apparatus according to the first embodiment. In FIG. 7, portions identical to those depicted in FIG. 6A are denoted by the same reference numerals used in FIG. 6A and will not be further described. As depicted in FIG. 7, an incident portion of the polarization separation waveguide unit 601 (see, e.g., the incident portion 621 depicted in FIG. 6B) may be equipped with a diffraction grating (waveguide grating) of a low reflectance enabling wavelength selectivity for fixing the oscillation wavelength. For example, the waveguide grating can be formed by creating periodic grooves in the silicon polarization separation waveguide unit 601 by electron beam exposure. In this case, disposal of the FBG in the PMF 102 may be omitted.

Therefore, FIG. 7 depicts a configuration without the PMF 102. Without passing through an optical fiber, the output light from the LD 101 can be directly input to the depolarizer through spatial coupling (although a lens is required, the polarization plane is maintained), which is preferable with consideration of a number of advantages such as simplification and size reductions of the structure. The position of the diffraction grating is preferably located on the input side of the polarization separation waveguide unit 601 of the depolarizer. It is contemplated that the position is made closer to the LD 101 to acquire more preferable wavelength stability characteristics and to simplify fabrication of the diffraction grating.

Since the output light of the LD 101 is in the vertical or horizontal polarization state, the emission angle of the LD 101 itself is adjusted (rotated) such that light of a polarization plane between vertical and horizontal directions enters the polarization separation waveguide unit 601 for the separation into vertical and horizontal polarized waves by the polarization separation waveguide unit 601 of the depolarizer.

Figure 8:
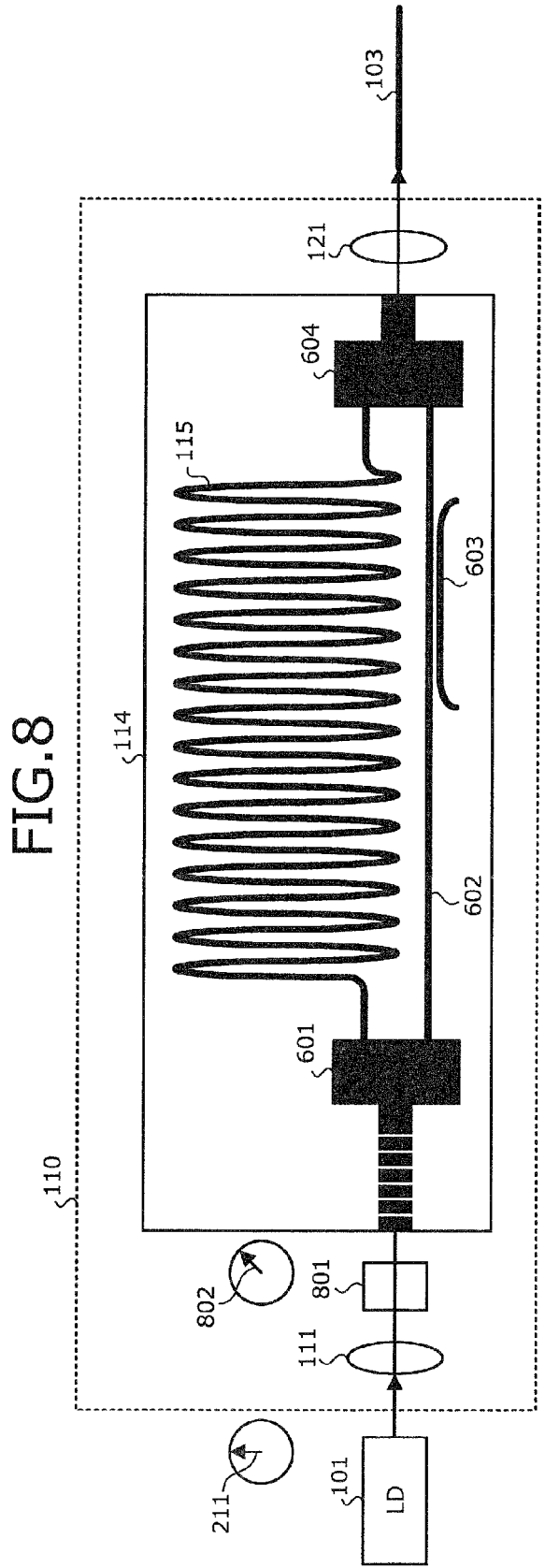
FIG. 8 is a diagram of a seventh configuration example of the polarization reducing apparatus according to the first embodiment.

FIG. 8 is a diagram of a seventh configuration example of the polarization reducing apparatus according to the first embodiment. In FIG. 8, portions identical to those depicted in FIG. 7 are denoted by the same reference numerals used in FIG. 7 and will not be further described. As depicted in FIG. 8, the polarization reducing apparatus 110 may include a ½ wavelength plate 801 in addition to the configuration depicted in FIG. 7. In this case, as indicated by a polarization state 211, the light entering the polarization reducing apparatus 110 is linearly-polarized light in the vertical direction.

Although FIG. 8 depicts the output light of the LD 101 in the case of polarization in the vertical direction, obviously the polarization may be in the horizontal direction. A polarization plane inclined by 45 degrees can be created by causing the output light to pass through the ½ wavelength plate 801 regardless of whether the polarized wave of the output light of the LD 101 is in the vertical direction or the horizontal direction.

The ½ wavelength plate 801 causes the polarization direction of the light from the lens 111 to rotate 45 degrees and outputs the resulting light to the polarization separation waveguide unit 601. A polarized state 802 indicates the polarization state of the light output from the ½ wavelength plate 801. As indicated by the polarized state 802, the polarization direction of the light entering the polarization separation waveguide unit 601 can be linearly-polarized at 45 degrees between the vertical direction and the horizontal direction.

Figure 9:
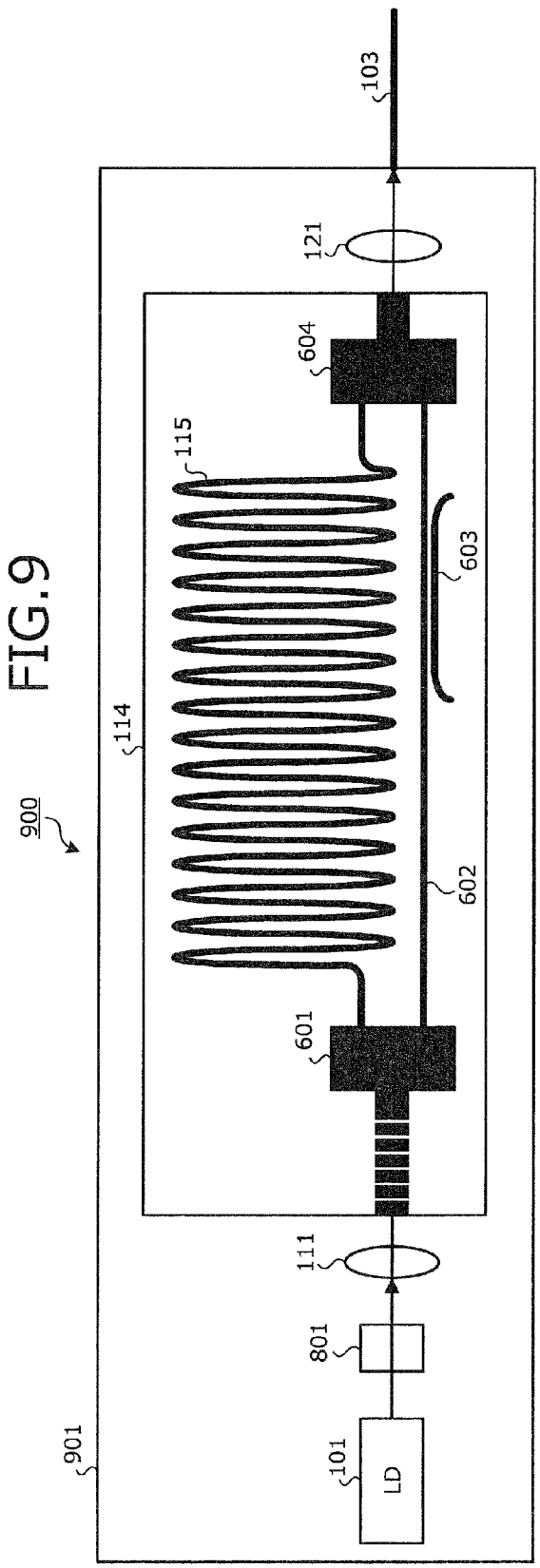
FIG. 9 is a diagram of a first configuration example of a light source apparatus to which the polarization reducing apparatus is applied.

FIG. 9 is a diagram of a first configuration example of a light source apparatus to which the polarization reducing apparatus is applied. In FIG. 9, portions identical to those depicted in FIG. 8 are denoted by the same reference numerals used in FIG. 8 and will not be further described. A light source apparatus 900 depicted in FIG. 9 is an LD module to which the polarization reducing apparatus 110 depicted in FIG. 8 is applied. The light source apparatus 900 includes the LD 101, the lens 111, the ½ wavelength plate 801, the silicon substrate 114, and the lens 121 in a housing 901 made of aluminum etc.

The SMF 103 is connected to the housing 901. The lens 121 transmits the light from the polarization combination waveguide unit 604, to the SMF 103 connected to the housing 901. As a result, the small-sized light source apparatus 900 can be realized. For example, the length of the housing 901 in the traveling direction of the light can be on the order of several [cm] as is the case with a general excitation LD module without a depolarizer function.

Since the depolarizer structure using a silicon thin line waveguide can realize drastic size reductions (extremely small size) (e.g., 10 [mm]×10 [mm] or less) as compared to depolarizers of the conventional techniques, the size of the light source module is not significantly changed even if the depolarizer is placed inside the light source module. Therefore, the depolarizer can be placed inside the light source module as depicted in FIG. 9 to implement a light source module that outputs light that is high quality, of a fixed wavelength, has high coherency, and is non-polarized (ideal DOP: 0%). For example, this is an ideal excitation light source module for Raman amplification.

Although the polarization reducing apparatus 110 depicted in FIG. 8 is applied to the light source apparatus 900 in the description, the polarization reducing apparatus 110 according to the configuration examples described above and hereinafter is applicable to the light source apparatus 900.

Figure 10:
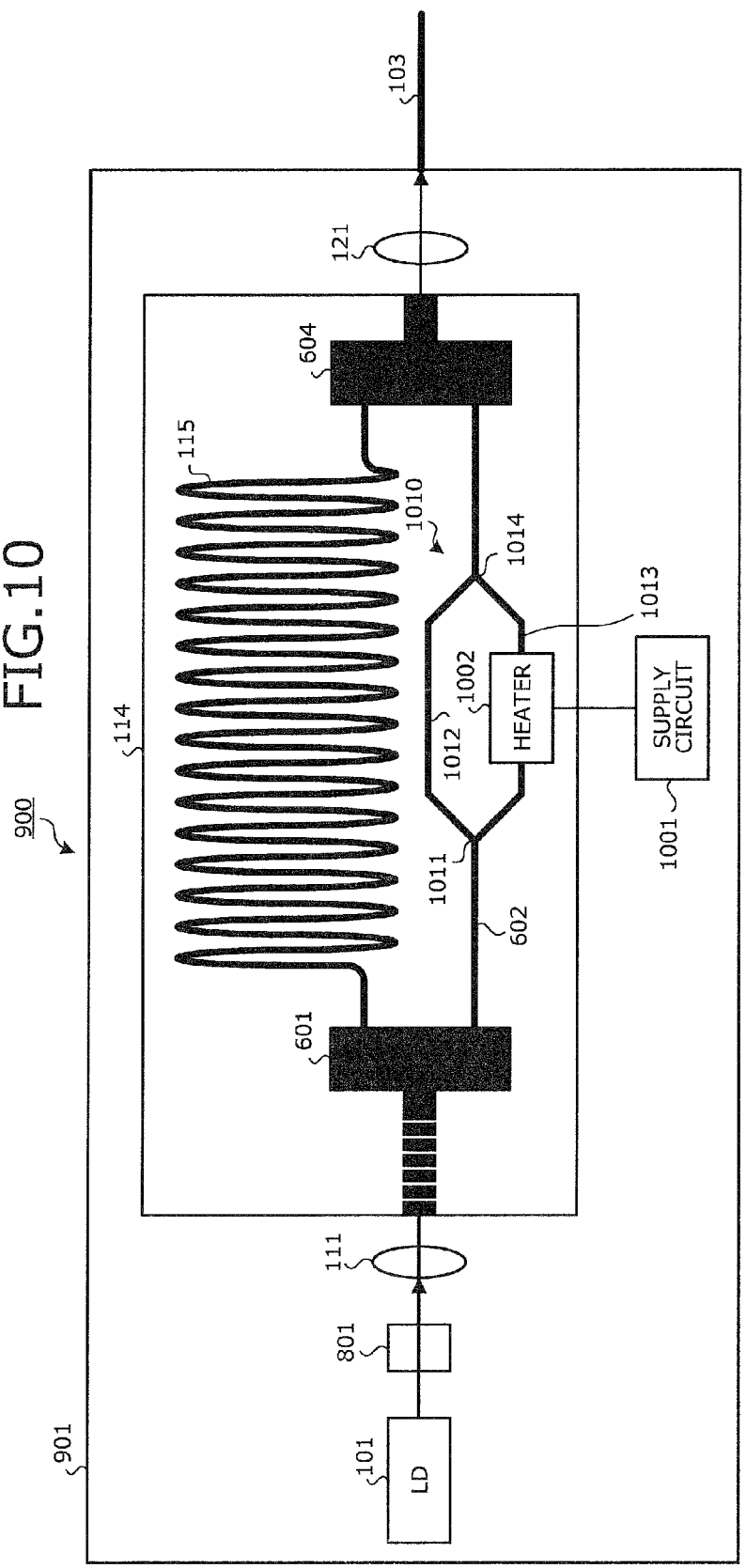
FIG. 10 is a diagram of a second configuration example of the light source apparatus to which the polarization reducing apparatus is applied.

FIG. 10 is a diagram of a second configuration example of the light source apparatus to which the polarization reducing apparatus is applied. In FIG. 10, portions identical to those depicted in FIG. 9 are denoted by the same reference numerals used in FIG. 9 and will not be further described. As depicted in FIG. 10, the silicon substrate 114 may be equipped with a branch interference unit 1010 instead of the loss waveguide 603. The light source apparatus 900 includes a heater 1002 and a supply circuit 1001.

The branch interference unit 1010 is disposed in the linear waveguide 602. The branch interference unit 1010 includes a branching unit 1011, parallel waveguides 1012, 1013, and an interfering unit 1014. The branching unit 1011 branches the light transmitted through the linear waveguide 602 and outputs the branches to the parallel waveguides 1012, 1013, respectively.

Each of the parallel waveguides 1012, 1013 transmits the light from the branching unit 1011 and outputs the light to the interfering unit 1014. The interfering unit 1014 causes interference of the light respectively from the parallel waveguides 1012, 1013 and outputs the resulting light to the polarization combination waveguide unit 604.

The supply circuit 1001 is disposed in the housing 901 and supplies power to the heater 1002. The heater 1002 is a temperature adjusting unit that adjusts a temperature difference of the parallel waveguides 1012, 1013. More specifically, the heater 1002 is disposed near the parallel waveguide 1013 and adjusts the temperature of the parallel waveguide 1013 by the power supplied from the supply circuit 1001. Thus, the temperature difference of the parallel waveguides 1012, 1013 can be adjusted.

By adjusting the temperature difference of the parallel waveguides 1012, 1013 (waveguides), the phase difference of the light at the interfering unit 1014 is changed, and the optical loss at the interfering unit 1014 can be adjusted. As described, the optical loss at the branch interference unit 1010 can be adjusted by adjusting the temperature of the heater 1002.

In the silicon substrate 114, the material of the portion in which the linear waveguide 602 is disposed may be formed of a quartz-based member that has quartz as a main material. As a result, since the linear waveguide 602 including the branch interference unit 1010 is formed of the quartz-based member, the refractive index of the linear waveguide 602 can be lowered and the optical path length difference from the winding waveguide 115 can be increased.

Figure 11:
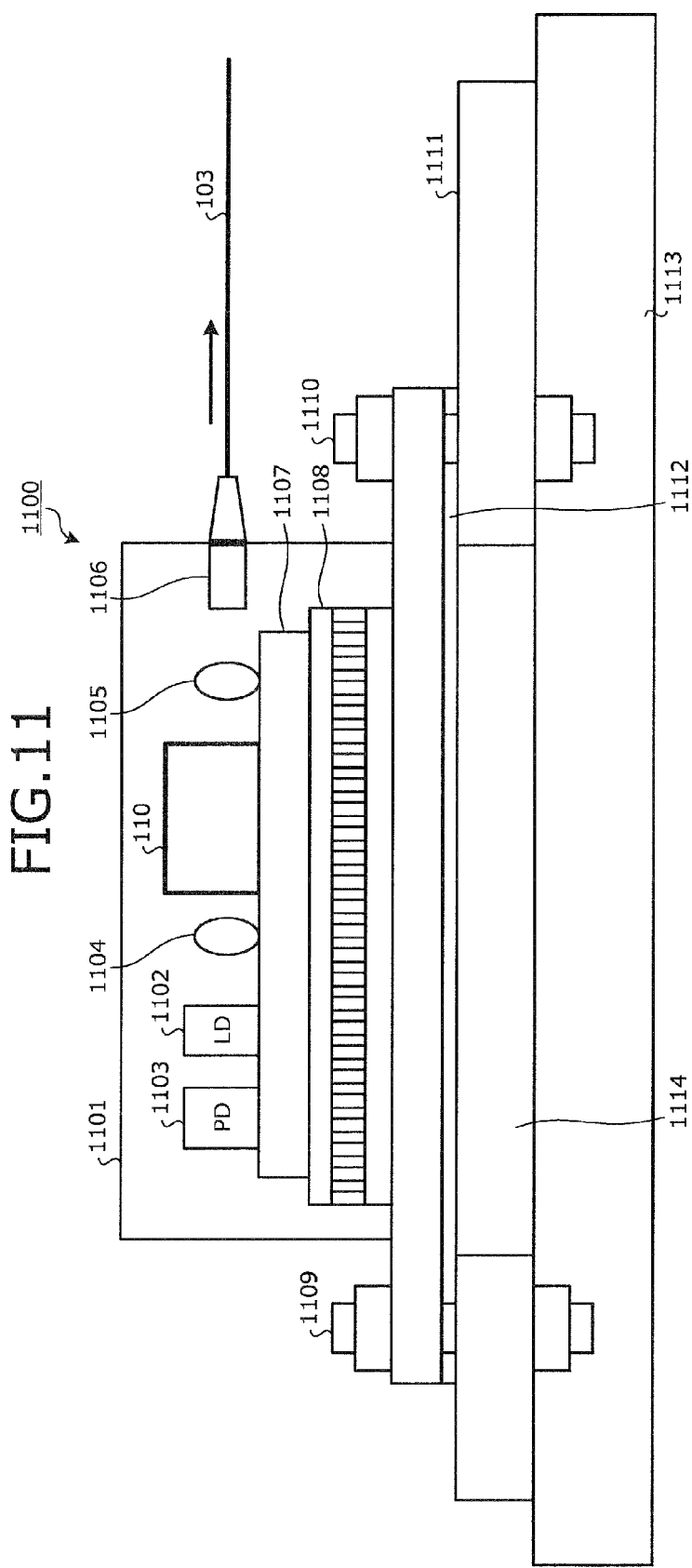
FIG. 11 is a diagram of a third configuration example of the light source apparatus to which the polarization reducing apparatus is applied.

FIG. 11 is a diagram of a third configuration example of the light source apparatus to which the polarization reducing apparatus is applied. A light source apparatus 1100 depicted in FIG. 11 includes an LD 1102, a PD 1103, a lens 1104, the polarization reducing apparatus 110, a lens 1105, a ferrule 1106, a fixed base 1107, and a TEC 1108 in a housing 1101.

The fixed base 1107 is formed of a heat conducting member. The fixed base 1107 is equipped with the LD 1102, the PD 1103, the lens 1104, the polarization reducing apparatus 110, and the lens 1105. The LD 1102 emits light to the lens 1105. The LD 1102 emits backlight to the PD 1103. The photo diode (PD) 1103 receives the backlight emitted by the LD 1102.

The lens 1104 transmits to the polarization reducing apparatus 110, the light emitted by the LD 1102. The polarization reducing apparatus 110 reduces the polarization degree of the light from the lens 1104 and outputs the resulting light to the lens 1105. The polarization reducing apparatus 110 according to the configurations described above is applicable to the polarization reducing apparatus 110.

The lens 1105 transmits the light from the polarization reducing apparatus 110 to the ferrule 1106. The ferrule 1106 outputs the light from the lens 1105 to the SMF 103 connected to the housing 1101. The SMF 103 outputs the light from the ferrule 1106 to an external destination outside of the housing 1101.

The fixed base 1107 is fixed to the housing 1101 via the TEC 1108. The thermoelectric cooler (TEC) 1108 controls the temperature of the fixed base 1107 at a constant level. Although the TEC 1108 is originally used for controlling the temperature of the LD 1102 at a constant level, the TEC 1108 is formed with a slightly larger area or the fixed base 1107 is used that is made of material having high heat conductivity with a slightly larger area, and the depolarizer is placed thereon. As a result, the temperature of the polarization reducing apparatus 110 along with that of the LD 1102, etc. can be kept constant. Consequently, for example, deformation of the silicon substrate 114 due to temperature change can be suppressed and the polarization degree reduction characteristics can be maintained. This can be achieved because the depolarizer is small (extremely small).

The case 1113 is, for example, a case of an optical amplifier and is, for example, a case made of aluminum. The housing 1101 is fixed to the case 1113 by screws 1109, 1110. A heat dissipation sheet 1112 and a printed board 1111 are disposed between the housing 1101 and the case 1113. The printed board 1111 is disposed with a heat sink 1114 made of aluminum, etc. As a result, the heat of the housing 1101 is dissipated via the heat dissipation sheet 1112, the heat sink 1114, and the case 1113 to the outside.

Figure 12:
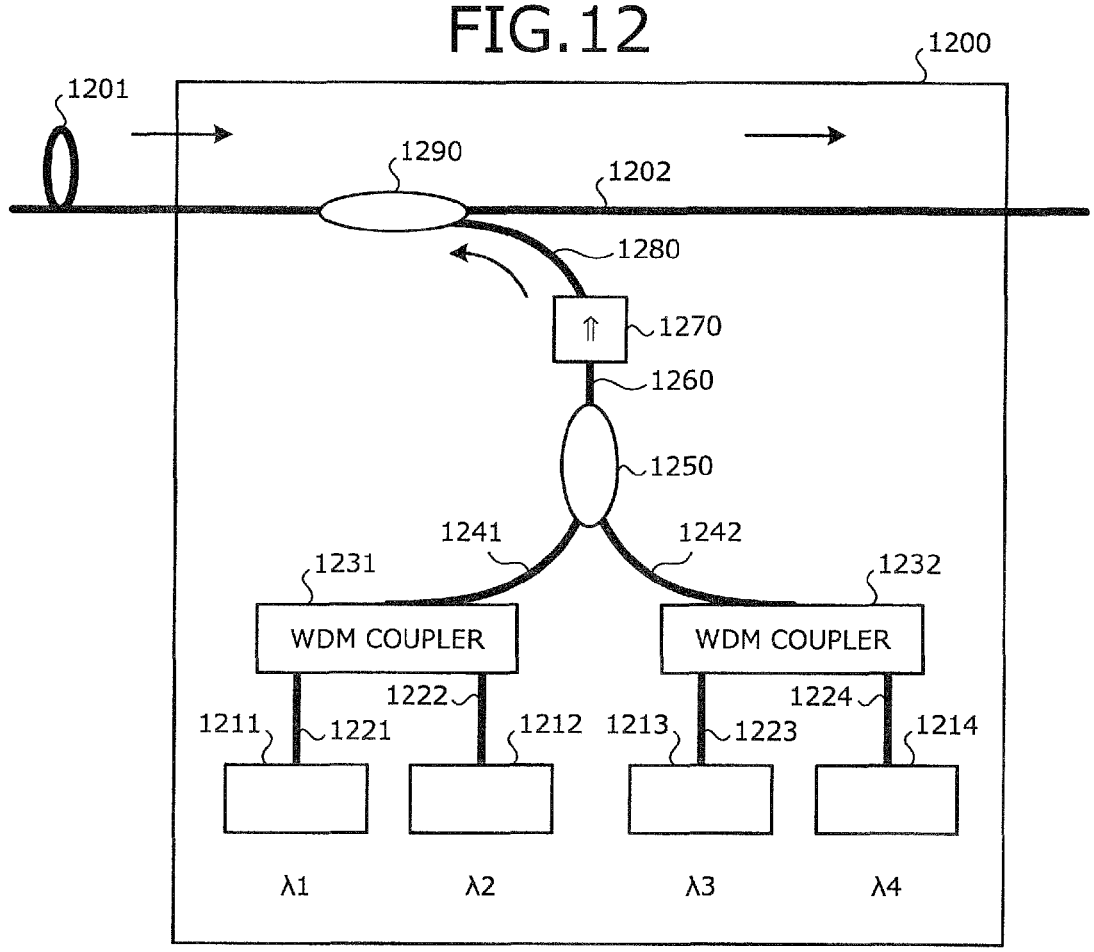
FIG. 12 is a diagram of a first configuration example of an optical amplifying apparatus.

FIG. 12 is a diagram of a first configuration example of an optical amplifying apparatus. An optical amplifying apparatus 1200 depicted in FIG. 12 is a Raman amplifier to which the polarization reducing apparatus 110 is applied. The optical amplifying apparatus 1200 performs Raman amplification of an optical signal output from an upstream optical fiber 1201 and outputs the Raman-amplified optical signal to an optical fiber 1202 downstream.

For example, the optical amplifying apparatus 1200 includes excitation light source apparatuses 1211 to 1214, SMFs 1221 to 1224, WDM couplers 1231, 1232, SMFs 1241, 1242, a WDM coupler 1250, an SMF 1260, an isolator 1270, an SMF 1280, and an excitation light inserting unit 1290 (incident unit).

The excitation light source apparatuses 1211 to 1214 depolarize and output excitation light of wavelengths λ1 to λ4, respectively. The light source apparatus 900 or 1100 depicted in FIGS. 9 to 11 is applicable to each of the excitation light source apparatuses 1211 to 1214.

The excitation light from the excitation light source apparatuses 1211 and 1212 is output to the WDM coupler 1231, via the SMFs 1221 and 1222, respectively. The excitation light from the excitation light source apparatuses 1213 and 1214 is output to the WDM coupler 1232, via the SMF 1223 and 1224, respectively.

The WDM coupler 1231 multiplexes the wavelengths of the light from the SMF 1221, 1222 and outputs the wavelength-multiplexed light. The WDM coupler 1232 multiplexes wavelengths of the light from the SMF 1223, 1224 and outputs the wavelength-multiplexed light. The light output from the WDM couplers 1231 and 1232 is output to the WDM coupler 1250, via the SMFs 1241 and 1242, respectively.

The WDM coupler 1250 multiplexes wavelengths of the light from the SMFs 1241, 1242 and outputs the wavelength-multiplexed light. The light output from the WDM coupler 1250 is output to the isolator 1270, via the SMF 1260. The isolator 1270 outputs the light from the SMF 1260 to the SMF 1280. The isolator 1270 transmits light only in the direction indicated by an arrow in the drawing and blocks light in the opposite direction. Therefore, leak light possibly output from the SMF 1280 is prevented from entering the excitation light source apparatuses 1211 to 1214 (consequently, the excitation light source apparatuses 1211 to 1214 can output stable light). The SMF 1280 outputs the light from the isolator 1270 to the excitation light inserting unit 1290.

The excitation light inserting unit 1290 causes the light from the SMF 1280 to enter the optical fiber 1201 as excitation light in the inverse direction of an optical signal passing through the optical fiber 1201. The excitation light inserting unit 1290 outputs the optical signal from the optical fiber 1201 to the optical fiber 1202. This enables Raman amplification of the optical signal transmitted through the optical fiber 1201. The excitation light inserting unit 1290 can be implemented by not only a WDM coupler but also a dielectric multilayer film optical filter, an etalon type optical filter, and a circulator.

In this example (FIGS. 12 to 18A), although rear distribution Raman amplification (propagating excitation light in the direction opposite to the traveling direction of signal light) is taken as an example in all cases, the excitation direction is not limited. The present embodiments can support not only rear distribution Raman amplification but also front distribution Raman amplification and bidirectional distribution Raman amplification (supportable by merely changing the method of applying the excitation light inserting unit 1290). The present embodiments are applicable not only to distribution Raman amplification but also to centralized Raman amplification.

Since the optical amplifying apparatus 1200 can use the small-sized excitation light source apparatuses 1211 to 1214 having a function of reducing the polarization degree, reductions in the size of the apparatus can be achieved while properties of Raman amplification are improved. Since the polarization degree can be reduced without using a long PMF, a drop in the polarizer function due to polarization cross talk deterioration can be suppressed. As compared to the case of using a long PMF, increases in size of the apparatus can be avoided.

By using the excitation light source apparatuses 1211 to 1214 having a light source integrated with the polarization reducing apparatus 110, an SMF can be used for guiding the excitation light. Therefore, as compared to a configuration using a long PMF for guiding the excitation light, not only size reductions, cost reductions, excellent mass productivity, and a reduction of the types of parts can be achieved, but also drops in the polarizer function can be suppressed by preventing deterioration of a linear polarization property of light entering the depolarizer, due to occurrence of mode coupling.

The configuration can be simplified as compared to a conventional distribution Raman amplifier since the present embodiments not only eliminate the need for using a long PMF but can also use SMFs to make up all the excitation system fibers without using expensive PMFs. The present embodiments eliminate the need for using a polarization beam combiner (PBC) for combining the excitation light of the wavelengths λ1 to λ4 and therefore, can prevent limitations on the excitation light wavelength due to wavelength characteristics of the PBC.

Figure 13:
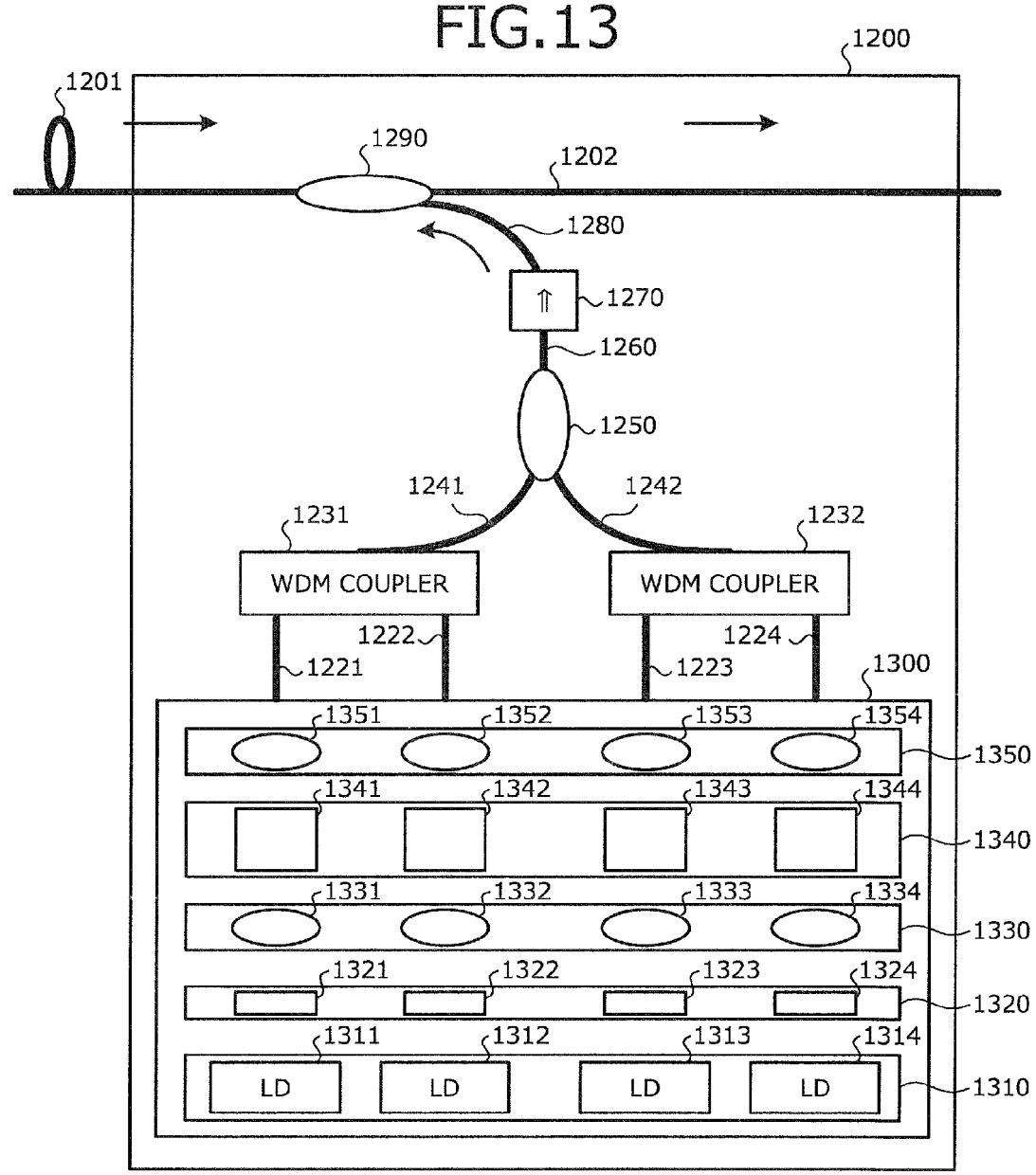
FIG. 13 is a diagram of a second configuration example of the optical amplifying apparatus.

FIG. 13 is a diagram of a second configuration example of the optical amplifying apparatus. In FIG. 13, portions identical to those depicted in FIG. 12 are denoted by the same reference numerals used in FIG. 12 and will not be further described. As depicted in FIG. 13, the optical amplifying apparatus 1200 may include an excitation light source apparatus 1300 instead of the excitation light source apparatuses 1211 to 1214 depicted in FIG. 12. The excitation light source apparatus 1300 includes an LD array 1310, a wavelength plate array 1320, a lens array 1330, a depolarizer array 1340, and a lens array 1350.

The LD array 1310 has LDs 1311 to 1314 disposed in an array. The LDs 1311 to 1314 emit excitation light of wavelengths λ1 to λ4, respectively. The wavelength plate array 1320 has ½ wavelength plates 1321 to 1324 disposed in an array. The ½ wavelength plates 1321 to 1324 cause the polarization directions of the light emitted from the respective LDs 1311 to 1314 to rotate 45 degrees, and output the resulting light. The lens array 1330 has lenses 1331 to 1334 disposed in an array. The lenses 1331 to 1334 transmit the light from the respective ½ wavelength plates 1321 to 1324 and output the resulting light.

The depolarizer array 1340 has depolarizers 1341 to 1344 disposed in an array. The depolarizers 1341 to 1344 reduce the polarization degrees of the light from the respective lenses 1331 to 1334 and output the resulting light. The polarization reducing apparatus 110 according to the configuration examples described above is applicable to each of the depolarizers 1341 to 1344.

The lens array 1350 has lenses 1351 to 1354 disposed in an array. The lenses 1351 to 1354 transmit and output the light from the respective depolarizers 1341 to 1344. The light output from the lenses 1351 and 1352 is output to the WDM coupler 1231, via the SMFs 1221 and 1222, respectively. The light output from the lenses 1353 and 1354 is output to the WDM coupler 1232, via the SMFs 1223 and 1224, respectively.

As described, further reductions in the size of the apparatus can be achieved by using the excitation light source apparatus 1300, which implements the functions of the excitation light source apparatuses 1211 to 1214 depicted in FIG. 12 as an integrated module.

Figure 14:
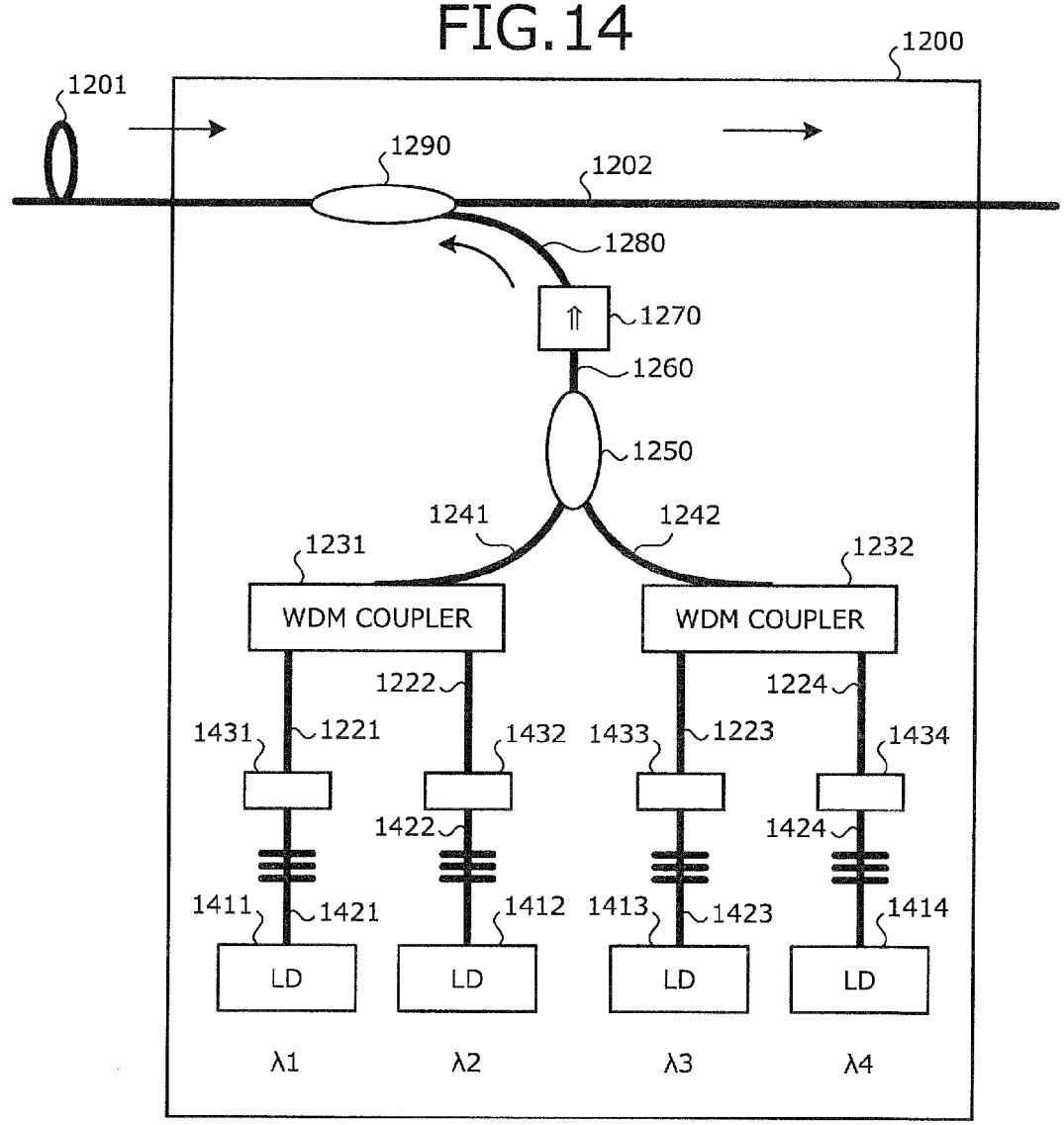
FIG. 14 is a diagram of a third configuration example of the optical amplifying apparatus.

FIG. 14 is a diagram of a third configuration example of the optical amplifying apparatus. In FIG. 14, portions identical to those depicted in FIG. 12 are denoted by the same reference numerals used in FIG. 12 and will not be further described. As depicted in FIG. 14, the optical amplifying apparatus 1200 may include LDs 1411 to 1414, PMFs 1421 to 1424, and depolarizers 1431 to 1434 instead of the excitation light source apparatuses 1211 to 1214 depicted in FIG. 12.

The LDs 1411 to 1414 emit excitation light of wavelengths λ1 to λ4, respectively. The excitation light emitted from the LDs 1411 to 1414 is emitted to the depolarizers 1431 to 1434 with the 45-degree linear polarization maintained by the respective PMFs 1421 to 1424. The PMFs 1421 to 1424 may be equipped with FBGs. As a result, the wavelengths of the excitation light can be controlled.

The depolarizers 1431 to 1434 reduce the polarization degrees of the light from the respective PMFs 1421 to 1424 and output the resulting light. The polarization reducing apparatus 110 according to the configuration examples described above is applicable to each of the depolarizers 1431 to 1434.

The lights output from the depolarizers 1431 and 1432 are output to the WDM coupler 1231, via the SMFs 1221 and 1222, respectively. The light output from the depolarizers 1433 and 1434 is output to the WDM coupler 1232, via the SMFs 1223 and 1224, respectively.

Figure 15:
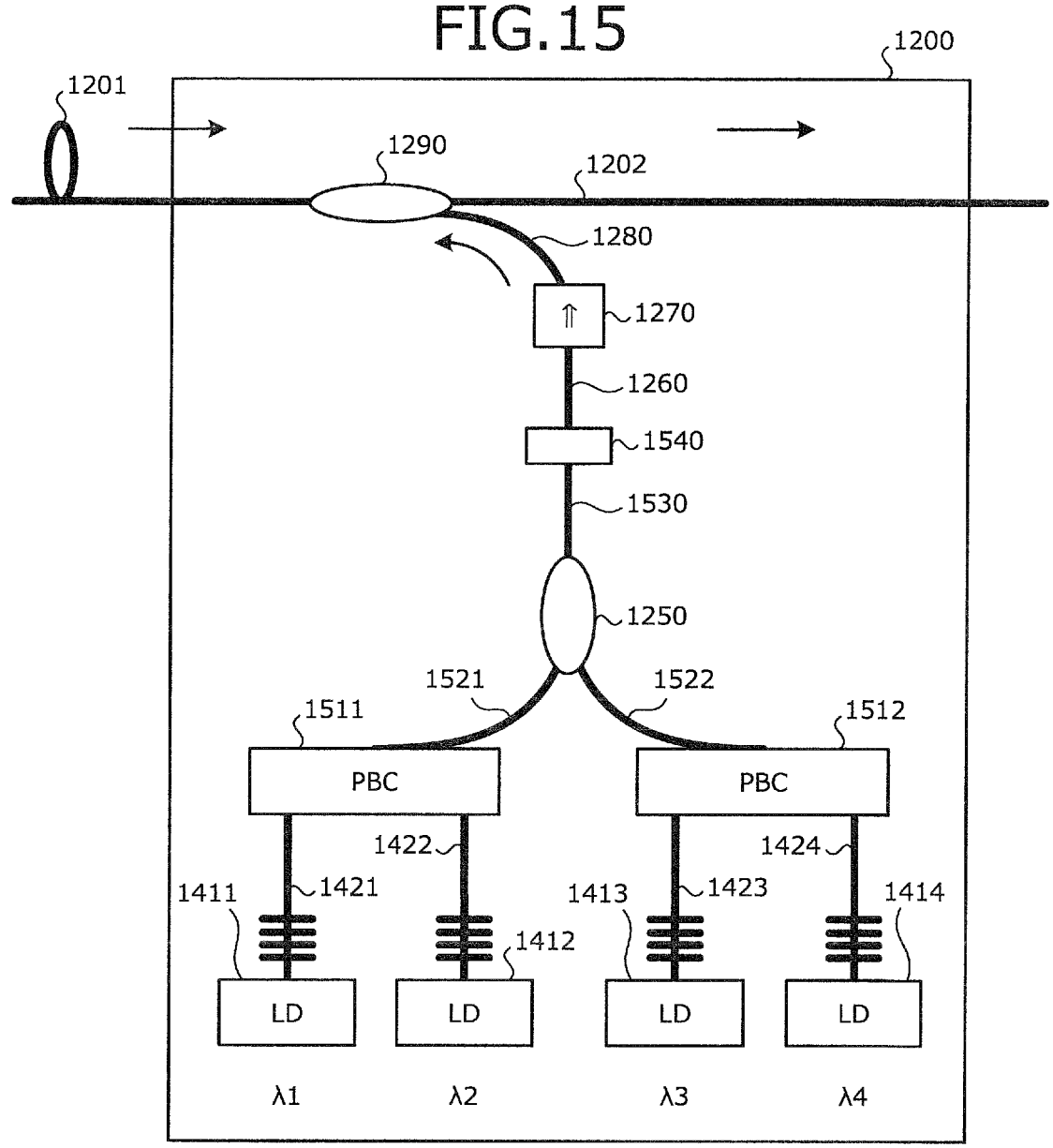
FIG. 15 is a diagram of a fourth configuration example of the optical amplifying apparatus.

FIG. 15 is a diagram of a fourth configuration example of the optical amplifying apparatus. In FIG. 15, portions identical to those depicted in FIG. 14 are denoted by the same reference numerals used in FIG. 14 and will not be further described. As depicted in FIG. 15, the optical amplifying apparatus 1200 may include PBCs 1511, 1512, PMFs 1521, 1522, a PMF 1530, and a depolarizer 1540. In this case, the optical amplifying apparatus 1200 is described as a configuration example without the need of including the SMFs 1221 to 1224, the WDM couplers 1231, 1232, and the SMFs 1241, 1242 depicted in FIG. 14.

The excitation light emitted from the LDs 1411 and 1412 is emitted to the PBC 1511 with the 45-degree linear polarization maintained by the PMFs 1421 and 1422, respectively. The excitation light emitted from the LDs 1413 and 1414 is emitted to the PBC 1512 with the 45-degree linear polarization maintained by the PMFs 1423 and 1424, respectively.

The PBC 1511 performs polarization combination of the light from the PMFs 1421 and 1422 and outputs the resulting light. The PBC 1512 performs polarization combination of the light from the PMFs 1423 and 1424 and outputs the resulting light. The light output from the PBCs 1521, 1522 is output to the WDM coupler 1250 with the polarization maintained by the PMFs 1521 and 1522, respectively.

The WDM coupler 1250 multiplexes wavelengths of the light from the PMF 1521, 1522 and outputs the wavelength-multiplexed light to the depolarizer 1540 with the polarization maintained via the PMF 1530.

The depolarizer 1540 reduces the polarization degrees of the light from the PMF 1530 and outputs the resulting light. The polarization reducing apparatus 110 according to the configuration examples described above is applicable to the depolarizer 1540. The light output from the depolarizer 1540 is output to the isolator 1270, via the SMF 1260.

Figure 16:
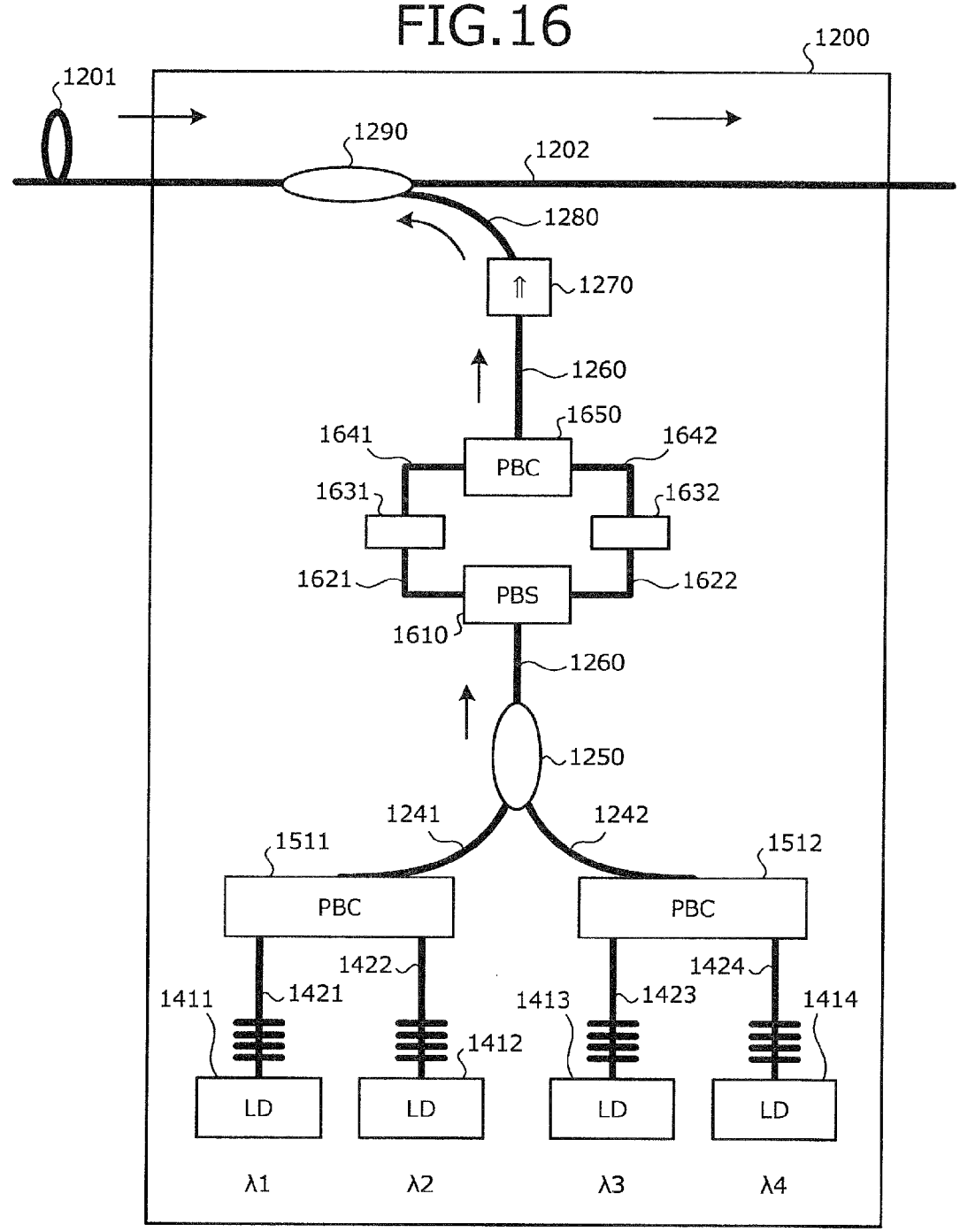
FIG. 16 is a diagram of a fifth configuration example of the optical amplifying apparatus.

FIG. 16 is a diagram of a fifth configuration example of the optical amplifying apparatus. In FIG. 16, portions identical to those depicted in FIG. 15 are denoted by the same reference numerals used in FIG. and will not be further described. As depicted in FIG. 16, the optical amplifying apparatus 1200 may include SMFs 1241, 1242, an SMF 1260, a PBS 1610, PMFs 1621, 1622, depolarizers 1631, 1632, PMFs 1641, 1642, and a PBC 1650. In this case, the optical amplifying apparatus 1200 may not include the PMFs 1521, 1522, the PMF 1530, and the depolarizer 1540 depicted in FIG. 15.

The light output from the PBCs 1511 and 1512 is output to the WDM coupler 1250 without maintaining the polarization through the SMFs 1241 and 1242, respectively. The light output from the WDM coupler 1250 is output to the PBS 1610, via the SMF 1260 without maintaining the polarization.

The polarization beam splitter (PBS) 1610 performs polarization separation of the light from the SMF 1260 and outputs the polarization-separated light. The light output from the PBS 1610 is output to the respective depolarizers 1631, 1632, via the respective PMFs 1621, 1622 and with the 45-degree linear polarization maintained.

The depolarizers 1631, 1632 reduce the polarization degrees of the light from the respective PMFs 1621, 1622 and output the resulting light. The polarization reducing apparatus 110 according to the configuration examples described above is applicable to each of the depolarizers 1631, 1632. The light output from the depolarizers 1631, 1632 is output to the PBC 1650, via the respective PMFs 1641, 1642.

The PBC 1650 performs polarization combination of the light from the PMFs 1641, 1642 and outputs the resulting light. The light output from the PBC 1650 is output to the isolator 1270, via the SMF 1260.

FIG. 17 is a diagram of a sixth configuration example of the optical amplifying apparatus. As depicted in FIG. 17, the optical amplifying apparatus 1200 includes LDs 1711 to 1714, lenses 1721 to 1724, a diffraction grating 1730 as a wavelength selecting device, a half mirror 1740 as a reflecting unit for optical resonance, a lens 1750, and a depolarizer 1760, a lens 1770, and a circulator 1780.

Each of the LDs 1711 to 1714 has an antireflection film formed on one end surface and a high reflective mirror as a reflecting component formed on the other end surface to achieve a configuration that induces an amplifying effect on the light propagating inside a medium and outputs the light from the end surface provided with the antireflection film. For example, a gain medium such as a semiconductor laser chip is usable for each of the LDs 1711 to 1714. The LDs 1711 to 1714 emit output light to the lenses 1721 to 1724, respectively. The lenses 1721 to 1724 transmit the light emitted by the respective LDs 1711 to 1714 to the diffraction grating 1730.

For example, the diffraction grating 1730 is a reflective type diffraction grating formed by cutting grooves at equal intervals d on a surface of a substrate and depositing a metal film on concave/convex surfaces thereof. The diffraction grating 1730 is placed in the middle of an optical resonator configuration made up of the LDs 1711 to 1714 and the half mirror 1740. The diffraction grating 1730 reflects the light from the LDs 1711 to 1714 and the half mirror 1740 at a reflection point R on the metal film. Therefore, a resonation structure is achieved via the diffraction grating between the LDs 1711 to 1714 and the half mirror 1740 for laser oscillation and the oscillation wavelength of the LDs depends on the angle at which the output light of the LDs 1711 to 1714 is applied to the diffraction grating 1730.

The diffraction grating 1730 is equipped with a driving unit. This driving unit can rotate the diffraction grating 1730 about the reflection point R and the rotation angle is set for shifting the oscillation wavelength. A known driving mechanism is applicable to the drive of the diffraction grating 1730 by the driving unit and, for example, the diffraction grating 1730 is mechanically driven through motor control.

The half mirror 1740 is disposed opposing the diffraction grating 1730 and reflects a portion of orthogonally entering light reflected at the reflection point R of the diffraction grating 1730 to form respective optical resonator configurations for the high reflective mirrors of the LDs 1711 to 1714. The light transmitted through the half mirror 1740 is output to the lens 1750. The lens 1750 transmits the light from the half mirror 1740 to the depolarizer 1760.

The depolarizer 1760 reduces the polarization degree of the light from the lens 1750 and outputs the resulting light to the lens 1770. The polarization reducing apparatus 110 according to the configuration examples described above is applicable to the depolarizer 176. The lens 1770 transmits the light from the depolarizer 1760 to the circulator 1780.

The circulator 1780 outputs the optical signal from the optical fiber 1201 to the optical fiber 1202 downstream from the optical amplifying apparatus 1200. The circulator 1780 causes the light from the lens 1770 to enter the optical fiber 120 in the inverse direction of the optical signal transmitted through the optical fiber 1201. The operation of the diffraction grating 1730 as a wavelength selecting device is described in the patent document (Japanese Laid-Open Patent Publication No. 2003-324227), for example.

The present embodiments are applicable to a light source for Raman amplification. Since the entire excitation path from the LDs 1711 to 1714 to the circulator 1780 can be configured by spatial coupling using bulk parts, the output light of the LDs 1711 to 1714 can be input to the depolarizer 1760 with the polarization planes maintained, and it is merely necessary to apply the one depolarizer 1760 of the present embodiments to one position.

Simplification of configuration can be achieved for high functionality (excitation light wavelength multiplexing, excitation light wavelength fixation, variable wavelength light, and non-polarized light). Integral configuration/fabrication as one distribution Raman amplification module as in the case of the optical amplifying apparatus 1200 is excellent in mass productivity and advantageous. In this configuration, the oscillation wavelength of the LDs 1711 to 1714 depends on the angle at which the output light of the LDs 1711 to 1714 is applied to the diffraction grating 1730 and therefore, a diffraction grating may be omitted on the input side of a separating unit inside the depolarizer 1760. This is another factor leading to a lower cost relative to high functionality.

Figure 18A:
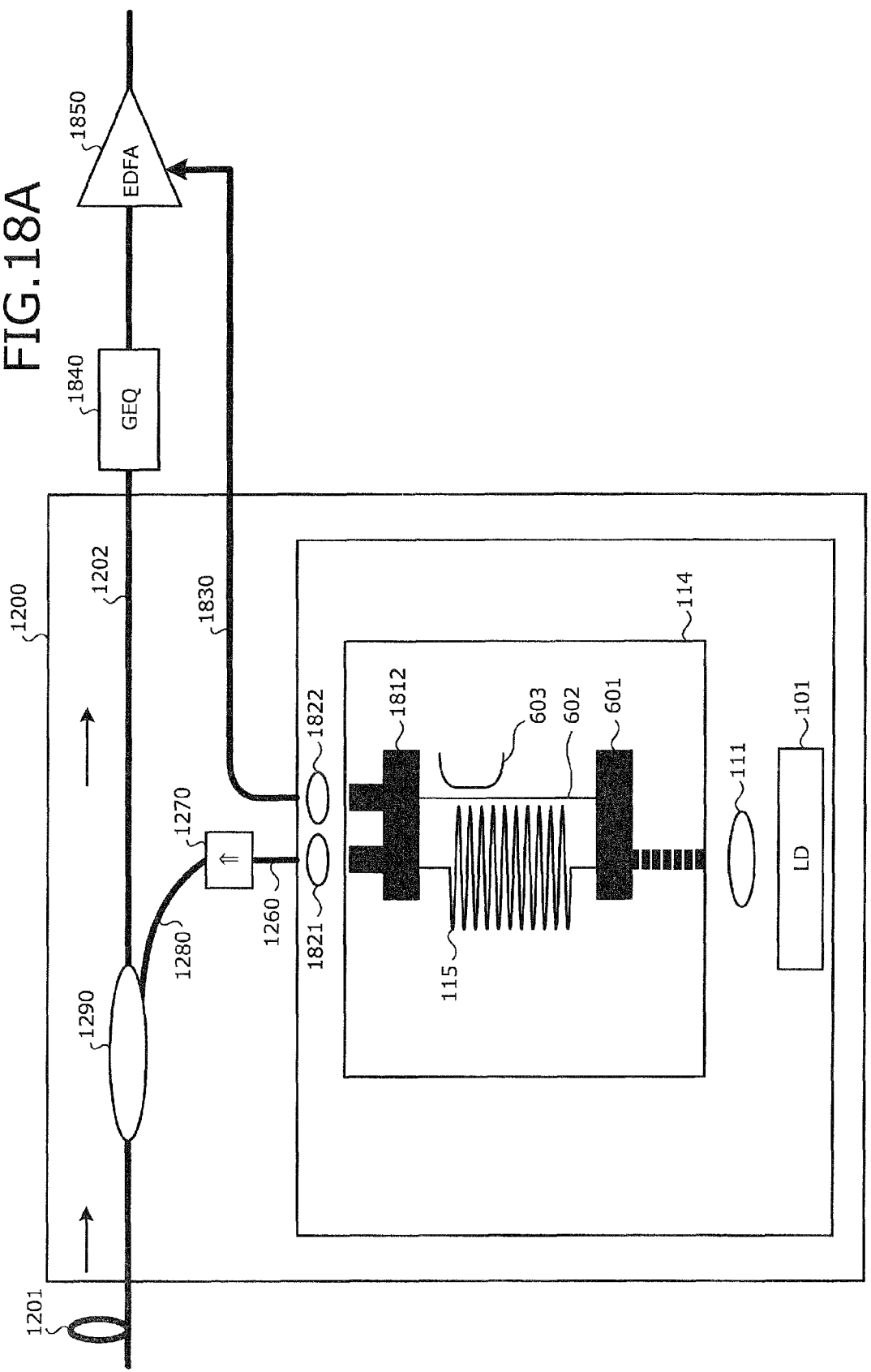
FIG. 18A is a diagram of a seventh configuration example of the optical amplifying apparatus.

FIG. 18A is a diagram of a seventh configuration example of the optical amplifying apparatus. In FIG. 18A, portions identical to those depicted in FIG. 12 or 7 are denoted by the same reference numerals used in FIGS. 12 and 7 and will not be further described. As depicted in FIG. 18A, the silicon substrate 114 may be equipped with a coupling unit 1812 instead of the polarization combination waveguide unit 604.

The coupling unit 1812 couples the light transmitted through the winding waveguide 115 and the light transmitted through the linear waveguide 602 at 3 [dB] (optical principle: a 3-dB coupler, a half mirror, etc.). The coupling unit 1812 outputs the coupled light to lenses 1821, 1822. The lens 1821 outputs the light from the coupling unit 1812 to the isolator 1270, via the SMF 1260. The lens 1822 outputs the light from the coupling unit 1812 to an EDFA 1850, via an SMF 1830.

A gain equalizer (GEQ) 1840 is disposed downstream from the excitation light inserting unit 1290. The GEQ 1840 executes a gain equalization process on an optical signal output from the excitation light inserting unit 1290. The GEQ 1840 outputs to the EDFA 1850, the optical signal subjected to the gain equalization process. The GEQ 1840 may perform the gain equalization with loss wavelength characteristics cancelling both the gain wavelength characteristics of the distribution Raman amplification upstream and the gain wavelength characteristics of an amplifying unit (e.g., the EDFA 1850) downstream.

The erbium doped fiber amplifier (EDFA) 1850 is disposed downstream from the GEQ 1840. The EDFA 1850 amplifies the optical signal output from the GEQ 1840 by using the light output from the SMF 1830 as excitation light.

Figure 18B:
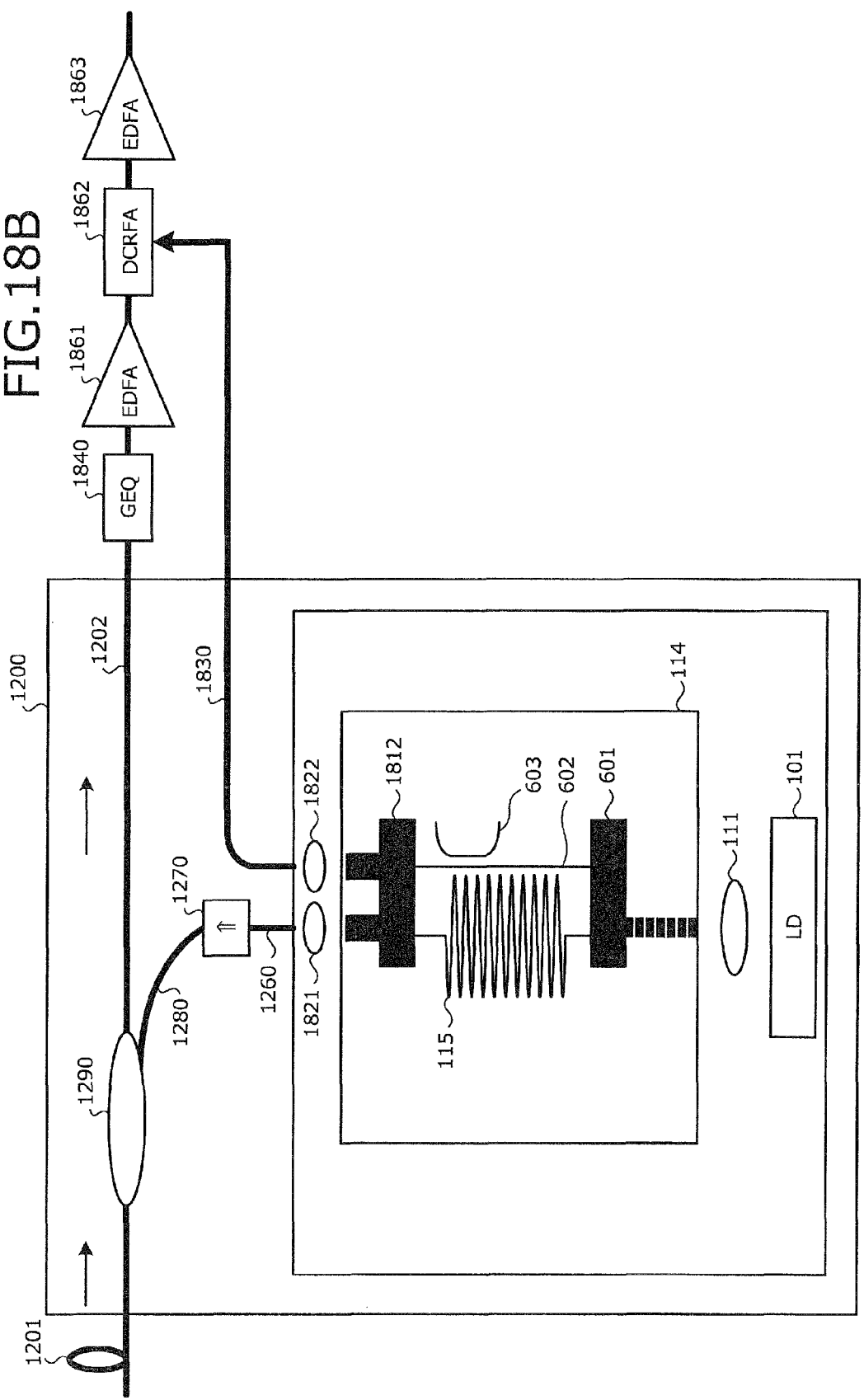
FIG. 18B is a diagram of an eighth configuration example of the optical amplifying apparatus.

FIG. 18B is a diagram of an eighth configuration example of the optical amplifying apparatus. In FIG. 18B, portions identical to those depicted in FIG. 18A are denoted by the same reference numerals used in FIG. 18A and will not be further described. As depicted in FIG. 18B, for example, an EDFA 1861, a DCRFA 1862, and an EDFA 1863 may be disposed in series downstream from the optical amplifying apparatus 1200. The DCRFA 1862 is a dispersion compensation fiber Raman amplifier (DCFRA) that amplifies the optical signal output from the GEQ 1840 by using the light output from the SMF 1830 as excitation light.

Figure 18C:
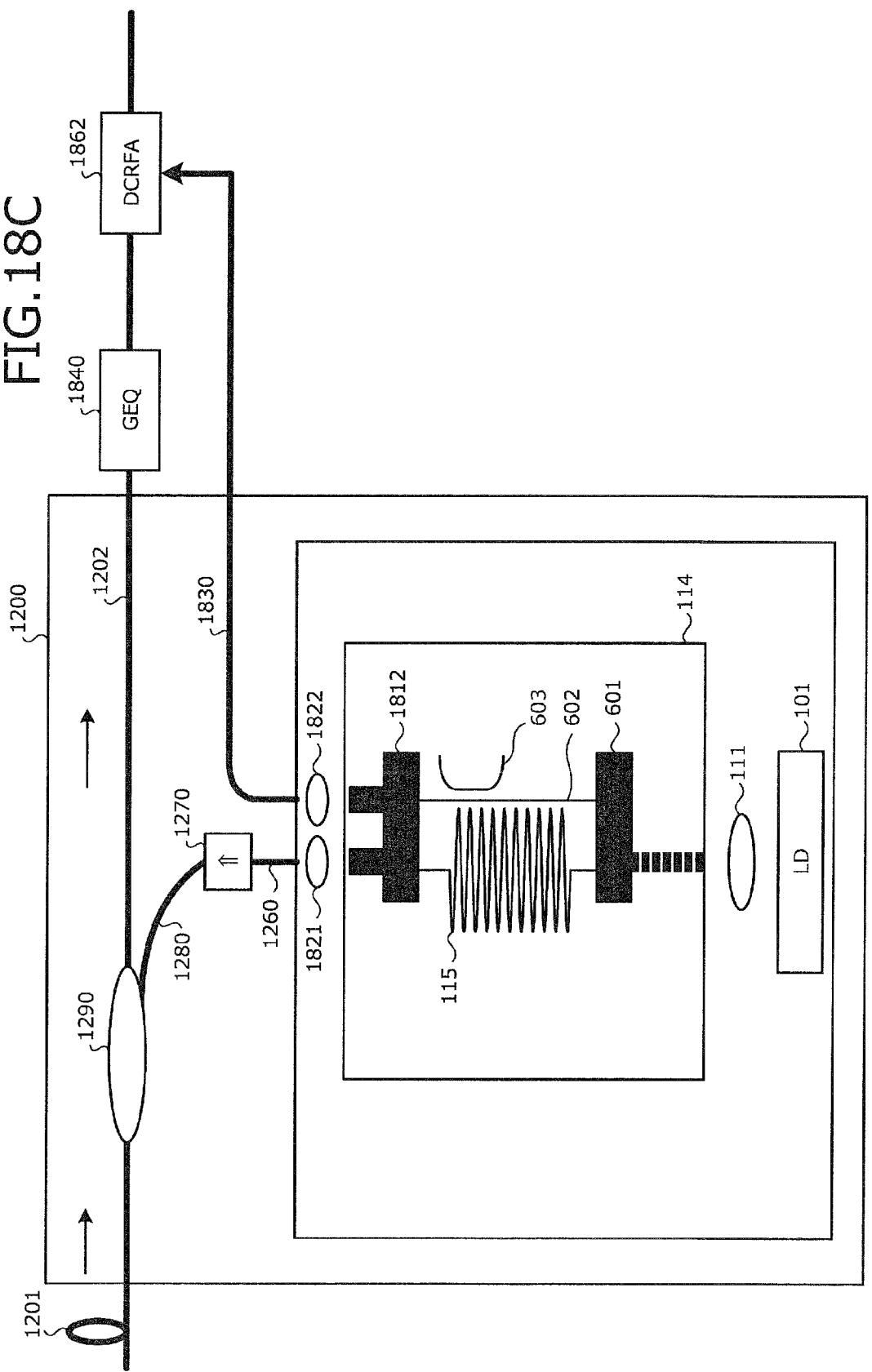
FIG. 18C is a diagram of a ninth configuration example of the optical amplifying apparatus.

FIG. 18C is a diagram of a ninth configuration example of the optical amplifying apparatus. In FIG. 18C, portions identical to those depicted in FIG. 18B are denoted by the same reference numerals used in FIG. 18B and will not be further described. As depicted in FIG. 18C, a configuration may omit the EDFAs 1861, 1863 depicted in FIG. 18B.

As depicted in FIGS. 18A to 18C, Raman amplification may be performed by one light output from the coupling unit 1812, and the other light may be utilized at the EDFA 1850 and the DCRFA 1862 downstream. Although the other light is utilized at the EDFA 1850 and the DCRFA 1862 in the described configuration, the other light may be utilized in not only the EDFA 1850 but also a centralized Raman amplifier, etc.

A centralized Raman amplifier is a technique of inserting excitation light into a dispersion compensation fiber to induce Raman amplification so as to compensate insertion loss of the dispersion compensation fiber, for example. The centralized Raman amplifier can improve the optical signal noise ratio (OSNR).

Figure 19:
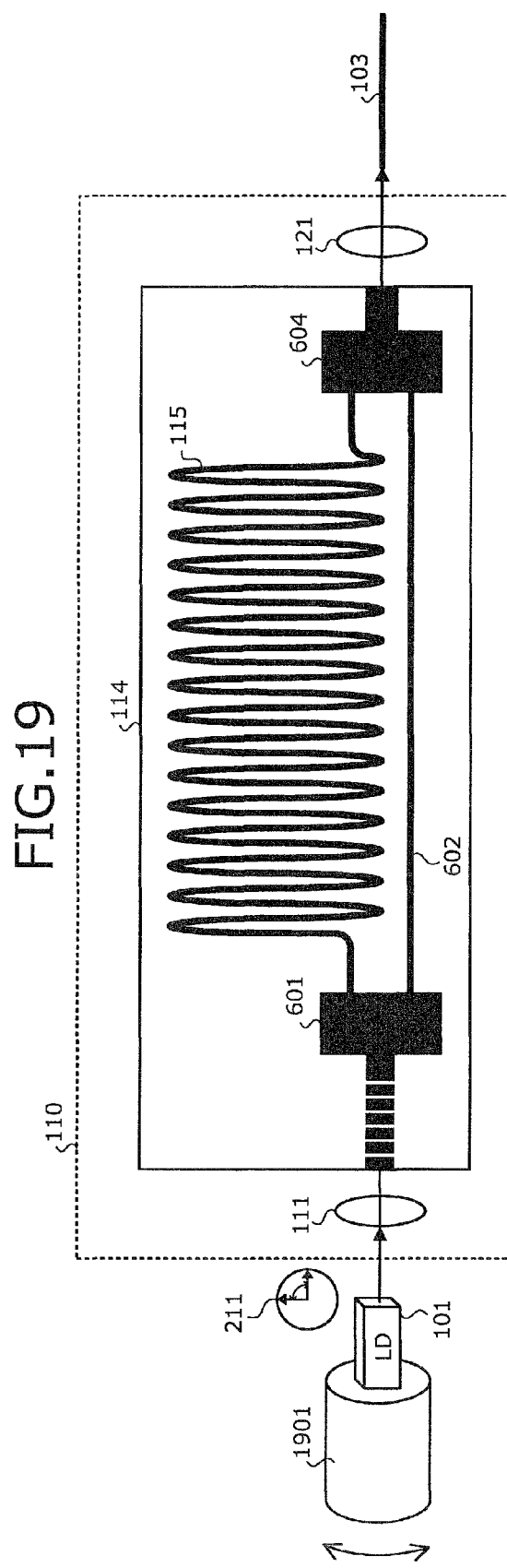
FIG. 19 is a diagram of a first configuration example of a light source apparatus according to a second embodiment.

FIG. 19 is a diagram of a first configuration example of a light source apparatus according to a second embodiment. In FIG. 19, portions identical to those depicted in FIG. 7 are denoted by the same reference numerals used in FIG. 7 and will not be further described. The light source apparatus depicted in FIG. 19 includes a movable plate 1901, the LD 101, and the polarization reducing apparatus 110. The configuration depicted in FIG. 19 corresponds to a configuration method in which the loss waveguide 603 may be omitted in the silicon substrate 114 and is more preferable. Even if the loss waveguide 603 is disposed, the loss waveguide 603 may be disposed that has a smaller optical loss as compared to the configuration depicted in FIG. 7, for example.

The LD 101 is fixed to the movable plate 1901. The movable plate 1901 makes the LD 101 rotatable about a rotation axis defined as a direction of the emission of light by the LD 101. As a result, as indicated by the polarization state 211, the polarization direction of light emitted by the LD 101 can be varied. By making the polarization direction of light emitted by the LD 101 variable, the intensity ratio between the light emitted to the winding waveguide 115 and the light emitted to the linear waveguide 602 can be changed.

Therefore, a difference in optical loss between the winding waveguide 115 and the linear waveguide 602 can be compensated to reduce a difference in intensity between the lights to be polarization-combined by the polarization combination waveguide unit 604. As a result, the polarization degree of the light output from the polarization combination waveguide unit 604 can be reduced further. For example, the optical loss of the winding waveguide 115 is, for example, about 3 [dB] larger than the optical loss of the linear waveguide 602, the rotation angle of the LD 101 is adjusted such that the intensity ratio between the light in the vertical polarization state and the light in the horizontal polarization state is set to about 2:1. As a result, a difference in intensity between the light to be polarization-combined by the polarization combination waveguide unit 604 is substantially equalized.

Since the loss waveguide 603 may be omitted and, even when the loss waveguide 603 is disposed, only a small optical loss may be associated and the optical loss in the silicon substrate 114 can be reduced. Since the loss waveguide 603 may be omitted, the silicon substrate 114 can easily be processed.

Figure 20:
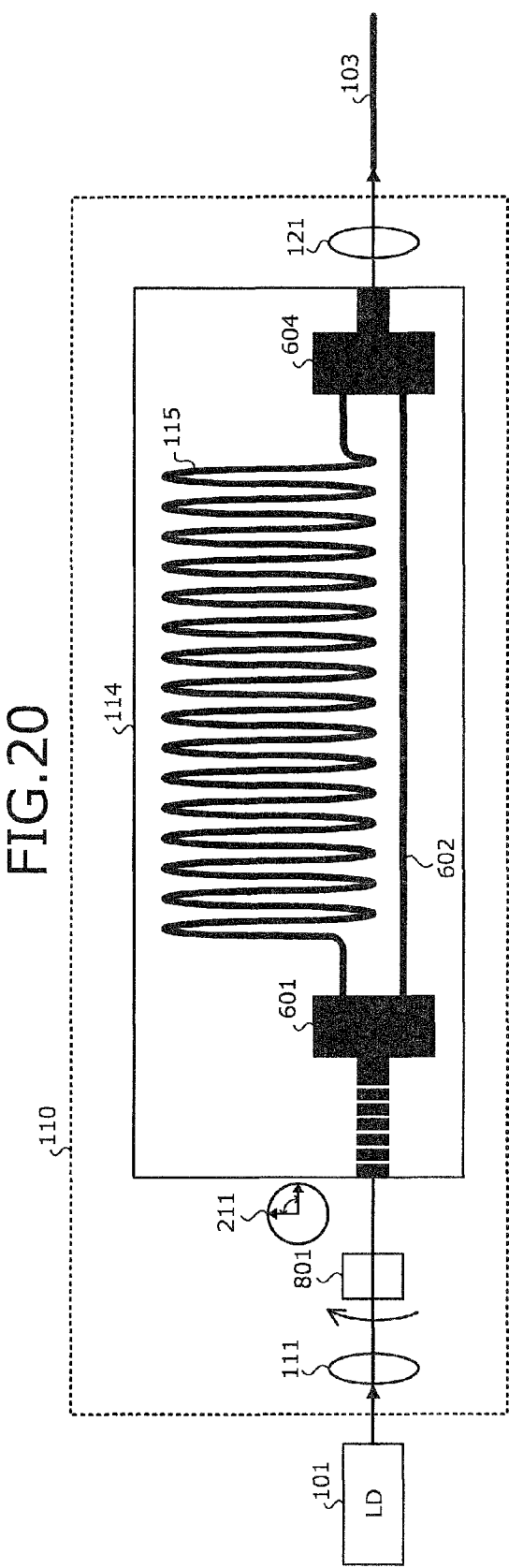
FIG. 20 is a diagram of a second configuration example of the light source apparatus according to the second embodiment.

FIG. 20 is a diagram of a second configuration example of the light source apparatus according to the second embodiment. In FIG. 20, portions identical to those depicted in FIG. 8 or 19 are denoted by the same reference numerals used in FIGS. 8 and 19 and will not be further described. As depicted in FIG. 20, the ½ wavelength plate 801 may be made rotatable about a rotation axis defined as a transmission direction of light through the ½ wavelength plate 801. As a result, as indicated by the polarization state 211, the polarization direction of light output by the ½ wavelength plate 801 can be varied. By making the polarization direction of light output by the ½ wavelength plate 801 variable, the intensity ratio between the light emitted to the winding waveguide 115 and the light emitted to the linear waveguide 602 can be changed.

Therefore, the difference in optical loss between the winding waveguide 115 and the linear waveguide 602 can be compensated to reduce the difference in intensity between the lights to be polarization-combined by the polarization combination waveguide unit 604. As a result, the polarization degree of the light emitted from the polarization combination waveguide unit 604 can be reduced further. Since the loss waveguide 603 may also be omitted in this case and, even when the loss waveguide 603 is disposed, only a small optical loss may be associated and the optical loss in the silicon substrate 114 can be reduced. Since the loss waveguide 603 may be omitted, the silicon substrate 114 can easily be processed.

As depicted in FIGS. 19 and 20, an adjusting unit (e.g., the movable plate 1901 or the ½ wavelength plate 801) is disposed that adjusts the polarization direction of the light input to the polarization separation waveguide unit 601 into a polarization direction forming less than 45 degrees as a smaller one of the angles relative to the vertical direction. As a result, the intensity of the light in the vertical polarization state separated by the polarization separation waveguide unit 601 can be made greater than the intensity of the light in the horizontal polarization state separated by the polarization separation waveguide unit 601. Since the optical loss of the winding waveguide 115 is larger than the optical loss of the linear waveguide 602, a difference in optical loss between the winding waveguide 115 and the linear waveguide 602 can be compensated and a difference in intensity of the light to be combined by the polarization combination waveguide unit 604 can be made smaller to reduce the polarization degree.

For example, the adjusting unit adjusts the polarization direction of the light input to the polarization separation waveguide unit 601 into a polarization direction in which the intensities in the polarization combination waveguide unit 604 are made equal between the light transmitted through the silicon substrate 114 and the light transmitted through the linear waveguide 602. As a result, the polarization degree can further be reduced.

Figure 21:
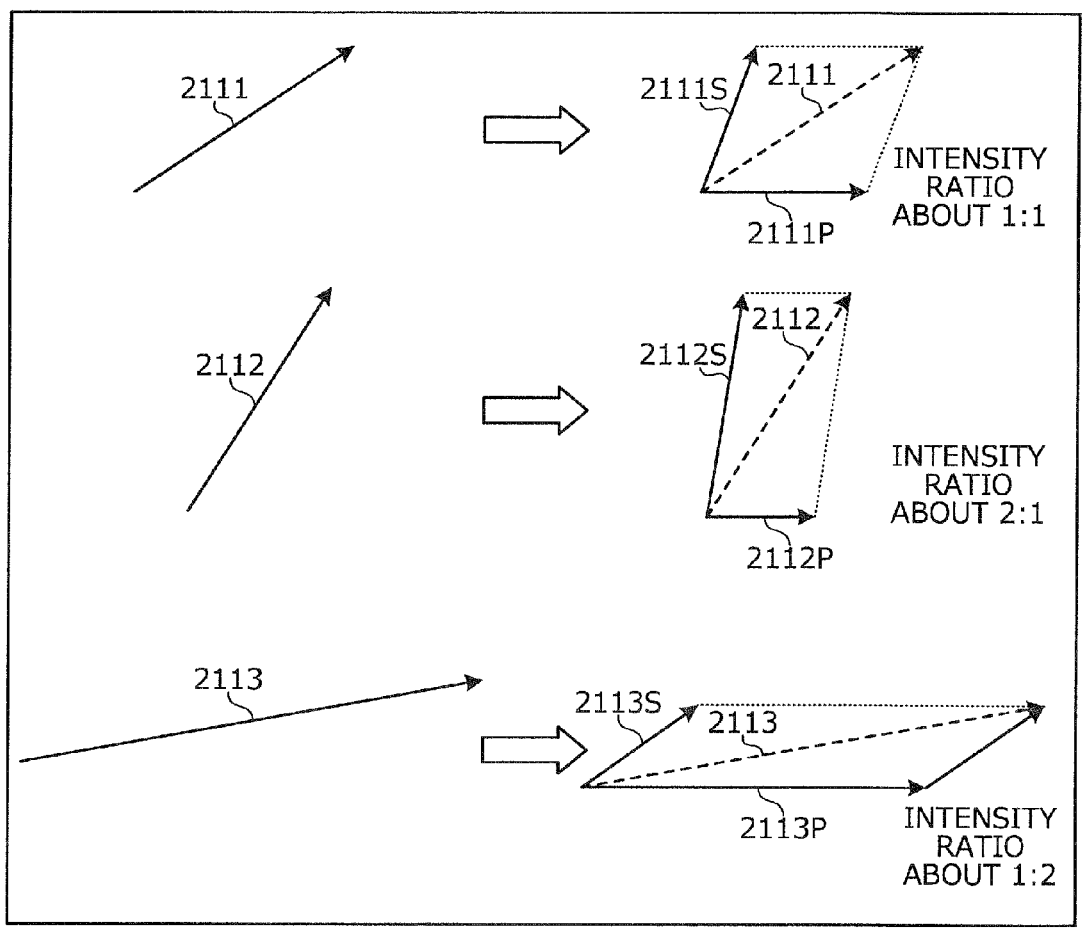
FIG. 21 is a diagram of an example of control of the intensity ratio through adjustment of a polarization direction.

FIG. 21 is a diagram of an example of control of the intensity ratio through adjustment of a polarization direction. Vectors 2111 to 2113 in FIG. 21 indicate the polarization direction and the intensity of the light entering the polarization separation waveguide unit 601.

The vector 2111 indicates a polarization direction of about 45 degrees relative to the polarization axis of the polarization separation waveguide unit 601. The light of the vector 2111 is separated into the S-wave of a vector 2111S and the P-wave of a vector 2111P in the polarization separation waveguide unit 601. In this case, the intensity ratio between the light output to the winding waveguide 115 and the light output to the linear waveguide 602 is about 1:1.

The vector 2112 indicates a polarization direction of about 60 degrees relative to the polarization axis of the polarization separation waveguide unit 601. The light of the vector 2112 is separated into the S-wave of a vector 2112S and the P-wave of a vector 2112P in the polarization separation waveguide unit 601. In this case, the intensity ratio between the light output to the winding waveguide 115 and the light output to the linear waveguide 602 is about 2:1.

The vector 2113 indicates the polarization direction of about 30 degrees relative to the polarization axis of the polarization separation waveguide unit 601. The light of the vector 2113 is separated into the S-wave of a vector 2113S and the P-wave of a vector 2113P in the polarization separation waveguide unit 601. In this case, the intensity ratio between the light output to the winding waveguide 115 and the light output to the linear waveguide 602 is about 1:2.

As described, by adjusting the polarization direction of the incident light relative to the polarization axis of the polarization separation waveguide unit 601, the intensity ratio between the light output to the winding waveguide 115 and the light output to the linear waveguide 602 can be changed.

Figure 22:
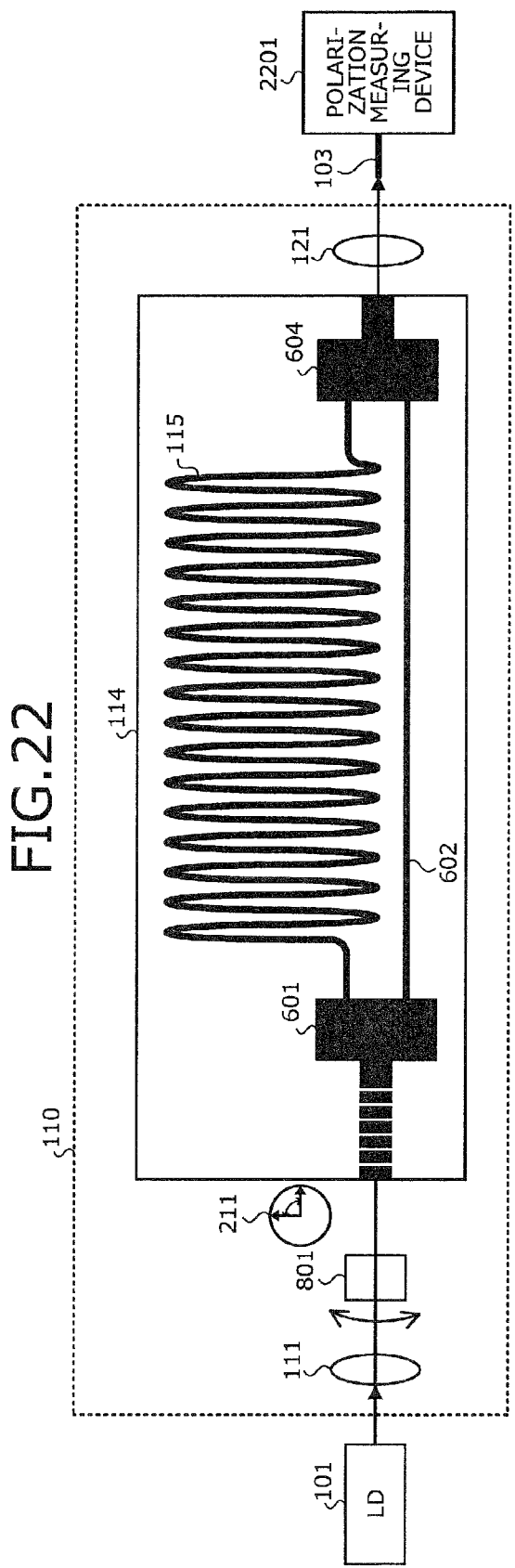
FIG. 22 is a diagram (part one) of an example of adjustment of the polarization direction.
Figure 23:
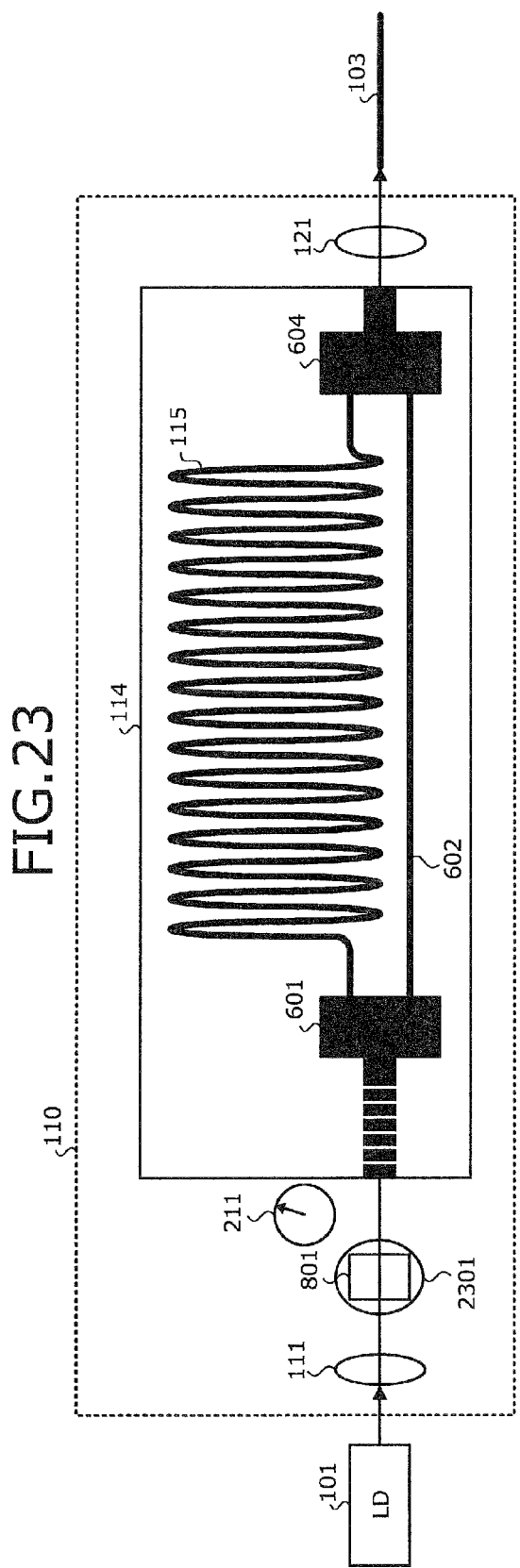
FIG. 23 is a diagram (part two) of an example of the adjustment of the polarization direction.

FIG. 22 is a diagram (part one) of an example of the adjustment of the polarization direction. FIG. 23 is a diagram (part two) of an example of the adjustment of the polarization direction. In FIGS. 22 and 23, portions identical to those depicted in FIG. 20 are denoted by the same reference numerals used in FIG. 20 and will not be further described.

For example, when the polarization direction of the light entering the polarization separation waveguide unit 601 is adjusted at the polarization reducing apparatus 110 depicted in FIG. 20, the designer disposes a polarization measuring device 2201 downstream from the SMF 103 as depicted in FIG. 22. The designer changes the rotation angle of the ½ wavelength plate 801 until the polarization degree measured by the polarization measuring device 2201 attains a target polarization degree (e.g., 0%).

The designer fixes the ½ wavelength plate 801 as depicted in FIG. 23 at the rotation angle of the ½ wavelength plate 801 when the polarization degree measured by the polarization measuring device 2201 attains the target polarization degree. For example, the ½ wavelength plate 801 is fixed by resin 2301 to a housing of the polarization reducing apparatus 110.

Although the adjustment of the polarization direction in the polarization reducing apparatus 110 depicted in FIG. 20 is described in this example, the same adjustment can be performed for the light source apparatus depicted in FIG. 19. For example, the designer disposes the polarization measuring device 2201 downstream from the SMF 103 depicted in FIG. 19 and changes the polarization plane direction of the output light of the LD 101 until the polarization degree measured by the polarization measuring device 2201 attains a target polarization degree. The designer fixes the movable plate 1901 at the rotation angle when the polarization degree measured by the polarization measuring device 2201 attains the target polarization degree.

In the configuration depicted in FIG. 20, a Faraday rotator may be disposed instead of the ½ wavelength plate 801. As a result, the polarization direction of the light entering the polarization separation waveguide unit 601 can be varied by the drive current to the Faraday rotator.

For example, a portion of the output light of the polarization combination waveguide unit 604 may be branched and the polarization degree of the branched output light may be measured by the polarization measuring device 2201. A control circuit may be disposed that controls the polarization direction of the light entering the polarization separation waveguide unit 601 to bring the polarization degree measured by the polarization measuring device 2201 closer to the target polarization degree. For example, if a Faraday rotator is used, the control circuit controls the drive current to the Faraday rotator to control the polarization direction of the light entering the polarization separation waveguide unit 601.

As a result, even during operation of the polarization reducing apparatus 110, a difference in optical loss between the winding waveguide 115 and the linear waveguide 602 can be compensated and a difference in intensities of the light to be polarization-combined in the polarization combination waveguide unit 604 can be made smaller.

Figure 24:
FIG. 24 is a diagram of an example of a cross section of a winding waveguide.

FIG. 24 is a diagram of an example of a cross section of a winding waveguide. As depicted in FIG. 24, the winding waveguide 115 is a ridge waveguide implemented by a convex portion formed on the silicon substrate 114, for example. Similarly, for example, the polarization separation waveguide unit 601, the linear waveguide 602, the loss waveguide 603, and the polarization combination waveguide unit 604 depicted in FIG. 6A are ridge waveguides implemented by convex portions formed on the silicon substrate 114. Various shapes are employable for a cross-sectional shape of the convex portion formed on the silicon substrate 114 depending on design.

Figure 25A:
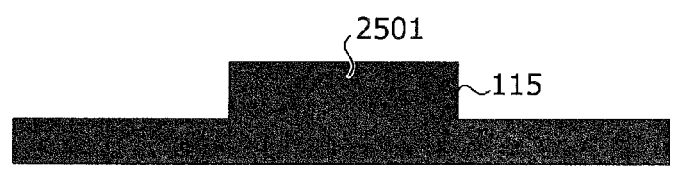
FIG. 25A is a diagram of a first example of a cross section of the winding waveguide having a cross-sectional shape formed into a rectangle.

FIG. 25A is a diagram of a first example of a cross section of the winding waveguide having a cross-sectional shape formed into a rectangle. As depicted in FIG. 25A, the winding waveguide 115 may be formed by a convex portion 2501 having a rectangular cross section elongated in the horizontal direction on the silicon substrate 115.

Figure 25B:
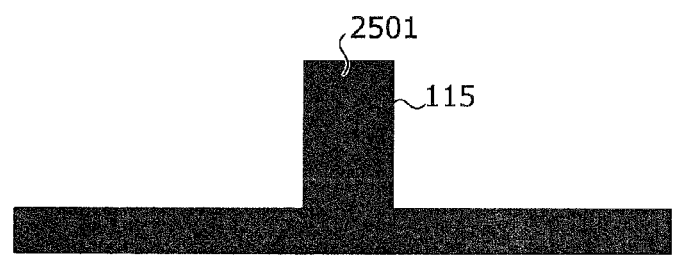
FIG. 25B is a diagram of a second example of a cross section of the winding waveguide having a cross-sectional shape formed into a rectangle.

FIG. 25B is a diagram of a second example of a cross section of the winding waveguide having a cross-sectional shape formed into a rectangle. As depicted in FIG. 25B, the winding waveguide 115 may be formed by the convex portion 2501 having a rectangular cross section elongated in the vertical direction on the silicon substrate 115.

Figure 25C:
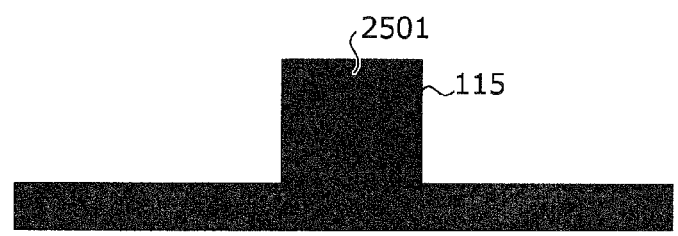
FIG. 25C is a diagram of an example of a cross section of the winding waveguide having a cross-sectional shape formed into a square.

FIG. 25C is a diagram of an example of a cross section of the winding waveguide having a cross-sectional shape formed into a square. As depicted in FIG. 25C, the winding waveguide 115 may be formed by the convex portion 2501 having a cross-sectional shape formed into a square.

As described, according to the polarization reducing apparatus, the light source apparatus, the optical amplifying apparatus, and the excitation light source apparatus for Raman amplification, reductions in the size of the apparatus can be achieved.

For example, as compared to the case of using a long PMF (e.g., 400 [m]) to implement a depolarizer, a larger optical path length can be realized by using the silicon thin-line ridge waveguide in the small-sized silicon substrate 114 and therefore, drastic reductions in the size of the apparatus can be achieved. Since it is not necessary to use a long PMF, polarization cross talk deterioration due to manufacturing variations of the long PMF can be prevented and drops in the polarizer function can be suppressed.

Since the silicon substrate 114 can be produced easily by, for example, silicone photonics technique, the silicon substrate 114 is excellent in mass productivity and fabrication costs can be suppressed as compared to the case of using a long PMF to implement a depolarizer.

In a Raman amplifier, Raman gain increases when signal light has a linearly polarized wave parallel to the polarization of excitation light and the Raman gain decreases when signal light has linearly polarized wave orthogonal to the polarization of excitation light. In the distribution Raman amplification technique for Raman amplification of a transmission path, if the transmission path has a section with large polarization mode dispersion (PMD), stable gain is difficult to achieve in the Raman amplification. Since the gain and the excitation light power of the distribution Raman amplification largely depend on the longitudinal direction of the transmission path, larger gain variations are generated depending on the PMD condition of the transmission path, the polarization state of the excitation light, and the polarization state of the signal light, resulting in fatal transmission property deterioration.

In this regard, by using the polarization reducing apparatus 110 according to the embodiments described above, the polarization degree of the excitation light of the Raman amplification can be made smaller to eliminate PDG while increases in size of the apparatus are suppressed.

For example, an excitation light source of a Raman amplifier is implemented by using a light source having a oscillation wavelength fixed by a fiber grating etc., a narrow spectrum line width, and high coherency. To polarize the excitation light emitted from such an excitation light source by a PMF, a longer PMF must be used. In this regard, by using the polarization reducing apparatus 110 according to the embodiments, the excitation light can be depolarized even by the small-sized polarization reducing apparatus 110.

As optical communication systems support higher speeds (e.g., 100 [Gb/s]), the OSNR must be increased so as to acquire better transmission characteristics. Therefore, Raman amplifiers are required to have a larger gain so as to increase the OSNR. On the other hand, a strict condition is made by smaller allowable polarization dependent gain (PDG) of the Raman amplification, and the depolarizing performance is required to achieve a polarization degree closer to the ideal value, i.e., 0%. In this regard, by using the polarization reducing apparatus 110 according to the embodiments described above, the polarization degree of the excitation light can be set to substantially 0% and the PDG of Raman amplification can be made smaller to further improve transmission quality.

Giving a supplementary explanation, since output light from an LD is in a vertical or horizontal polarization state, light of a polarization plane between vertical and horizontal directions (inclination of 45 degrees results in P-wave:S-wave=1:1) must enter the polarization separator of the depolarizer for the separation into vertical and horizontal polarized waves by the separating portion of the depolarizer.

Therefore, a ½ wavelength plate may be disposed between the LD and the depolarizer (FIGS. 8, 9, and 10, and FIG. 20 in which the polarization plane can arbitrarily be changed by rotating the angle of the wavelength plate). The LD itself may be rotated (FIG. 7 and FIG. 19 in which the polarization plane can arbitrarily be changed by rotating the angle of the LD). An end surface of a PMF fiber between the LD and the depolarizer may be twisted (FIGS. 1, 5, and 6A). In other words, by rotating the panda eyes of the PMF relative to the polarization plane of the LD output light, the polarization plane can be changed arbitrarily.

Although a silicon waveguide, a quartz-based waveguide, a compound semiconductor (Ga—As, In—P), etc. are applicable to the winding waveguide in the present embodiments, it may be considered that the structure using the silicon thin-line ridge waveguide is a most preferable example when the embodiments are implemented.

To further supplement the description, a silicon thin-line waveguide strongly confines light because of the high refractive index. The present embodiments utilize this property to effect elongation of the optical path length. Additionally, excitation light waveguide efficiency can be improved by the optical confinement. On the other hand, the strong optical confinement leads to a large photoelectric field density per unit area in a core cross section of an optical fiber and therefore, a nonlinear effect easily occurs.

If signal light is transmitted at an optical level associated with the occurrence of the nonlinear effect, transmission characteristics are likely to be adversely affected (a waveform is distorted and a transmission error occurs due to deformation of an eye pattern); however, application of the present embodiments to the excitation light eliminates such a concern. The excitation light may be introduced into an optical fiber at an optical level associated with occurrence of the nonlinear effect as long as predetermined excitation light power can be guided.

With regard to whether predetermined excitation light power can be guided, scattering due to the nonlinear effect acts as a negative factor and, if scattering strongly occurs, light of the predetermined optical power may not enter the optical fiber. However, because of a positive factor, i.e., the improvement in excitation light waveguide efficiency from the optical confinement as described above, it is considered that using the silicon thin line waveguide path as an excitation light waveguide medium is effective.

According to one aspect of the present embodiments, reductions in the size of the apparatus can be achieved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A polarization reducing apparatus comprising:
    a separating unit configured to separate input light into components having polarization directions orthogonal to each other;
    a winding waveguide of silicon formed on a silicon substrate in a winding manner, the winding waveguide transmitting a first component among the components separated by the separating unit;
    an optical path configured to have a shorter optical path length than the winding waveguide, the optical path transmitting a second component among the components separated by the separating unit;
    a waveguide formed on the silicon substrate, in proximity to the optical path, and inducing an optical loss on the second component transmitted through the optical path;
    a combining unit configured to combine the first component and the second component; and
    an output unit configured to output light including the first component and the second component combined by the combining unit,
    wherein the separating unit, the optical path, and the combining unit are silicon waveguides formed on the silicon substrate.

2. The polarization reducing apparatus according to claim 1, further comprising
    a branch interference unit configured to have parallel waveguides that branch the second component transmitted through the optical path and respectively transmit branches that result, the branch interference unit causing interference of the branches transmitted through the parallel waveguides before outputting the branches to the combining unit, and
    a temperature adjusting unit configured to adjust a temperature difference between the parallel waveguides.

* * * * *